United States Patent
Pucci et al.

(10) Patent No.: US 11,413,796 B2
(45) Date of Patent: Aug. 16, 2022

(54) APPARATUS AND METHOD FOR PROCESSING CUPS

(71) Applicant: SACMI COOPERATIVA MECCANICI IMOLA SOCIETA' COOPERATIVA, Imola (IT)

(72) Inventors: Fabrizio Pucci, Castelguelfo (IT); Fiorenzo Parrinello, Medicina (IT)

(73) Assignee: SACMI COOPERATIVA MECCANICI IMOLA SOCIETA' COOPERATIVA, Imola (IT)

(*) Notice: Subject to any disclaimer, the term of this patent is extended or adjusted under 35 U.S.C. 154(b) by 0 days.

(21) Appl. No.: 17/274,271

(22) PCT Filed: Oct. 8, 2019

(86) PCT No.: PCT/IB2019/058549
§ 371 (c)(1),
(2) Date: Mar. 8, 2021

(87) PCT Pub. No.: WO2020/075059
PCT Pub. Date: Apr. 16, 2020

(65) Prior Publication Data
US 2021/0308915 A1  Oct. 7, 2021

(30) Foreign Application Priority Data
Oct. 9, 2018  (IT) .......................... 102018000009295

(51) Int. Cl.
 *B32B 41/00* (2006.01)
 *B29C 43/02* (2006.01)
 (Continued)

(52) U.S. Cl.
 CPC .......... *B29C 43/021* (2013.01); *B29C 43/361* (2013.01); *B29C 43/52* (2013.01);
 (Continued)

(58) Field of Classification Search
 CPC ..... B29C 43/021; B29C 43/361; B29C 43/52; B29C 65/02; B29C 66/0222;
 (Continued)

(56) References Cited

U.S. PATENT DOCUMENTS 2,924,848 A   2/1960  Stover
4,100,842 A * 7/1978  Richards ................ B31D 1/005
                                                271/117
(Continued)

FOREIGN PATENT DOCUMENTS

CA   1185218 A    4/1985
FR   2481641 A1  11/1981
(Continued)

OTHER PUBLICATIONS

International Search Report issued in International Patent Application No. PCT/IB2019/058549 dated Jan. 21, 2020.
(Continued)

*Primary Examiner* — Michael N Orlando
*Assistant Examiner* — Joshel Rivera
(74) *Attorney, Agent, or Firm* — United IP Counselors, LLC

(57) ABSTRACT

An apparatus (1) for processing plastic cups (2), adapted to be filled with coffee or other products, whether solid or liquid, and to be closed with respective lids to form corresponding capsules, comprises: a plurality of pockets (50) for housing the cups (2); an infeed station (4) for receiving the cups (2) and placing them in respective pockets (50) of the plurality of pockets (50); at least one tool (31) for applying a process to a rear face (23B) of an annular flange (23) of a cup (2) housed a respective pocket (50), to form a sealing profile (230); an outfeed station (6) configured to release the cups (2) with the sealing profile (230) formed on them.

19 Claims, 9 Drawing Sheets

(51) Int. Cl.
    *B29C 43/36* (2006.01)
    *B29C 43/52* (2006.01)
    *B29C 65/02* (2006.01)
    *B29C 65/00* (2006.01)
    *B65D 85/804* (2006.01)
    *B29L 31/00* (2006.01)

(52) U.S. Cl.
    CPC .......... *B29C 65/02* (2013.01); *B29C 66/0222* (2013.01); *B29C 66/0242* (2013.01); *B29C 66/112* (2013.01); *B29C 66/131* (2013.01); *B29C 66/53461* (2013.01); *B65D 85/8043* (2013.01); *B29C 2043/023* (2013.01); *B29C 2043/3613* (2013.01); *B29C 2043/525* (2013.01); *B29C 2793/009* (2013.01); *B29C 2793/0054* (2013.01); *B29L 2031/7132* (2013.01); *B29L 2031/7164* (2013.01); *B29L 2031/7174* (2013.01)

(58) Field of Classification Search
    CPC . B29C 66/0242; B29C 66/112; B29C 66/131; B29C 66/53461; B29C 2043/023; B29C 2043/3613; B29C 2043/525; B29C 2793/0054; B29C 2793/009; B29C 66/0246; B29C 66/02241; B29C 2043/3636; B29C 43/08; B29L 2031/7132; B29L 2031/7164; B29L 2031/7174
    USPC .................... 156/60, 64, 350, 351, 378, 379
    See application file for complete search history.

(56) References Cited

U.S. PATENT DOCUMENTS

| | | | |
|---|---|---|---|
| 4,595,117 A | 6/1986 | Walter | |
| 5,118,002 A | 6/1992 | Sugiyama et al. | |
| 2015/0056341 A1* | 2/2015 | Trombetta | B65B 29/02 |
| | | | 53/111 R |
| 2016/0159563 A1 | 6/2016 | Bartoli et al. | |
| 2016/0355327 A1 | 12/2016 | Minganti | |

FOREIGN PATENT DOCUMENTS

| | | |
|---|---|---|
| JP | S38024594 B | 11/1963 |
| JP | H01257048 A | 10/1989 |
| JP | H054277 A | 1/1993 |
| JP | 2971185 B2 | 11/1999 |
| JP | 2006327650 A | 12/2006 |
| JP | 2011051345 A | 3/2011 |
| WO | 2007122208 A1 | 11/2007 |
| WO | 2013046014 A1 | 4/2013 |
| WO | 2016007006 A2 | 1/2016 |
| WO | 2016075321 A1 | 5/2016 |
| WO | 2017143142 A1 | 8/2017 |

OTHER PUBLICATIONS

Written Opinion issued in International Patent Application No. PCT/IB2019/058549 dated Jan. 21, 2020.
Chinese Office Action issued in Chinese Patent Application No. 201980065693.3, dated Mar. 31, 2022, with English Translation.
Japanese Office Action issued in Japan Patent Application No. 2021-519583, dated May 10, 2022, with English Translation.

* cited by examiner

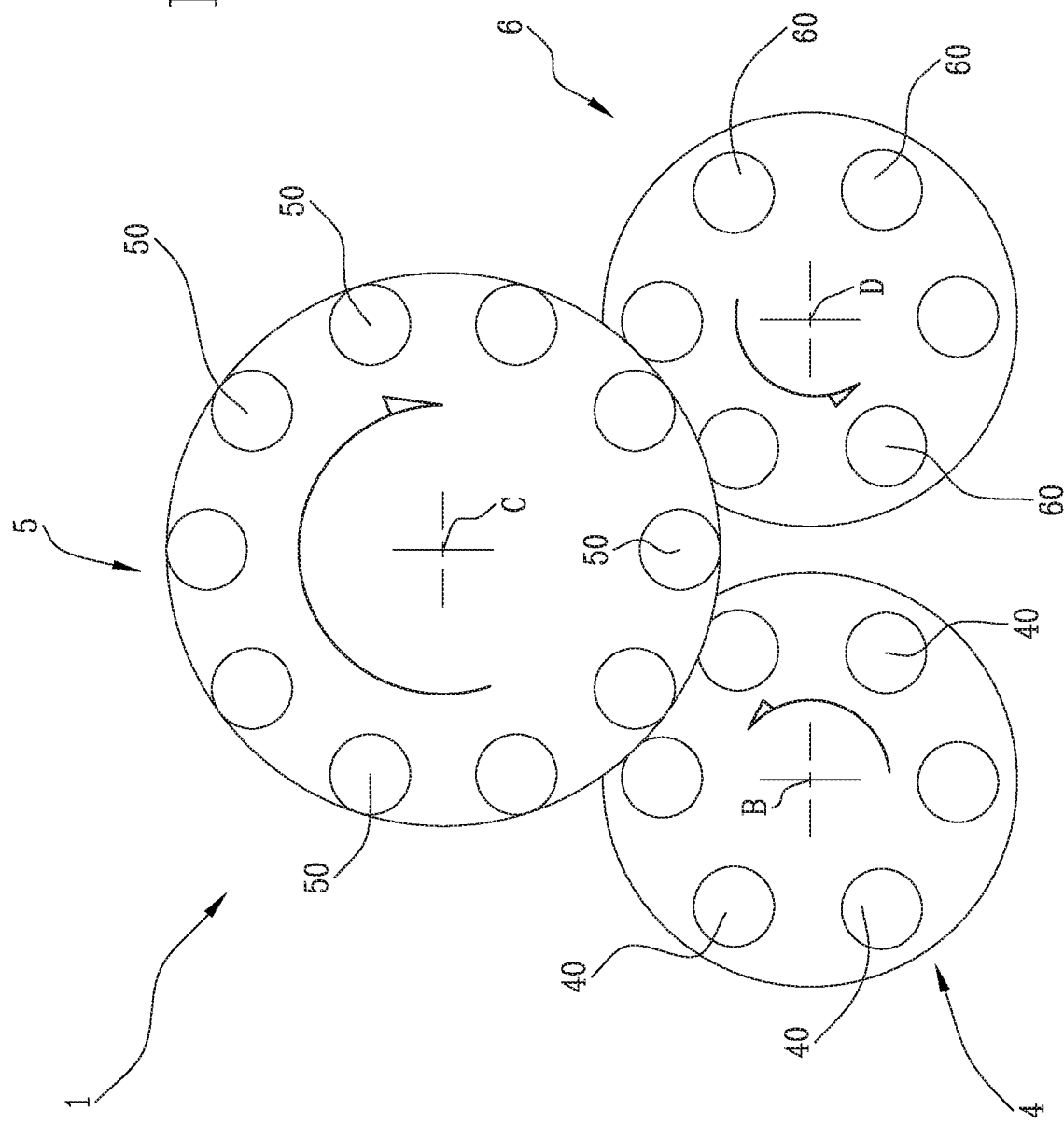

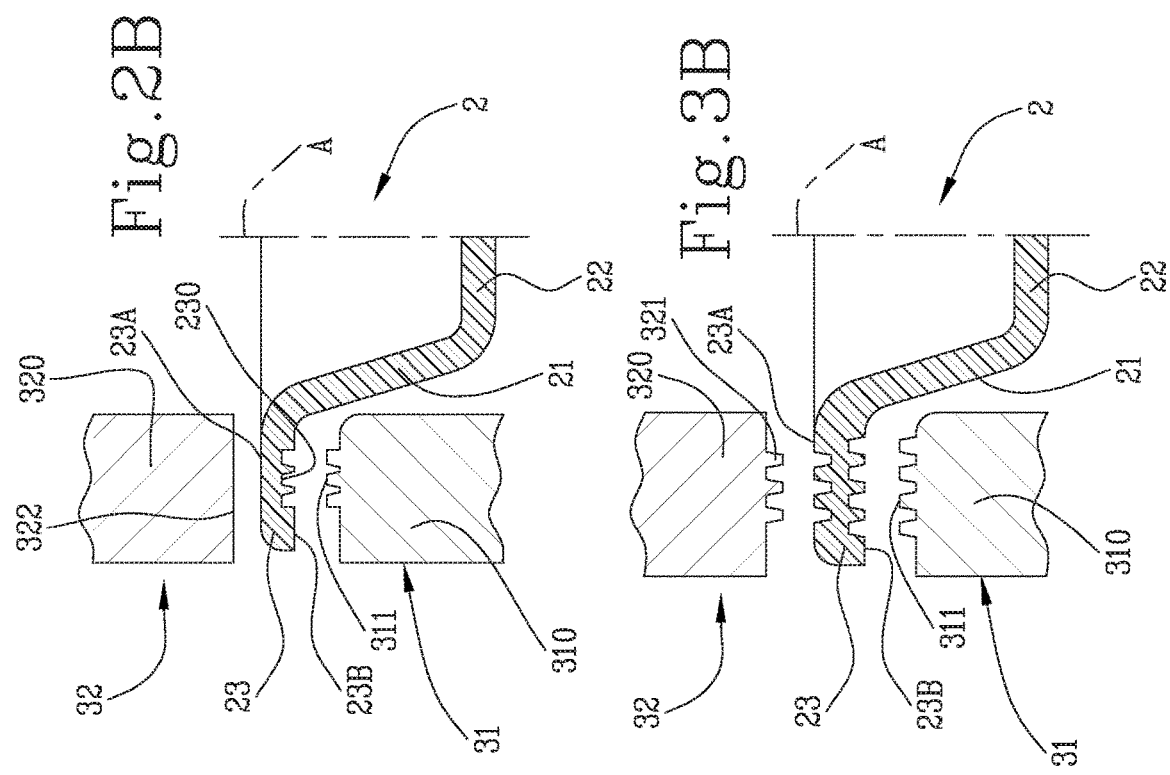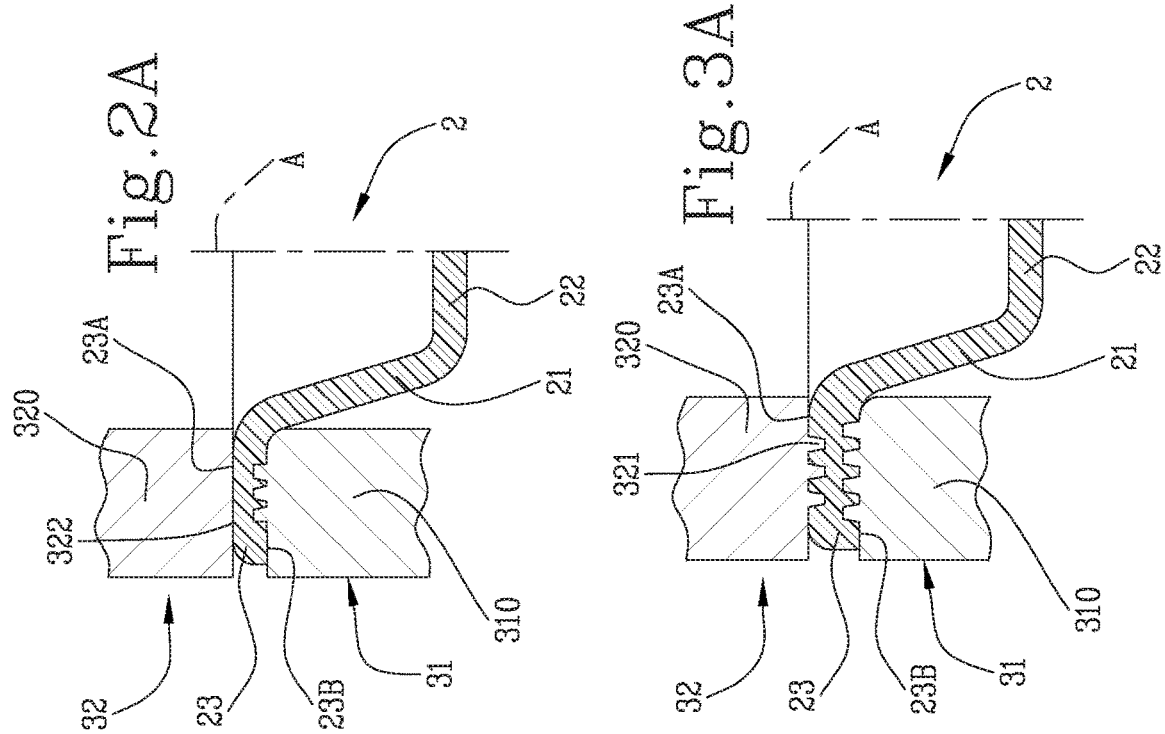

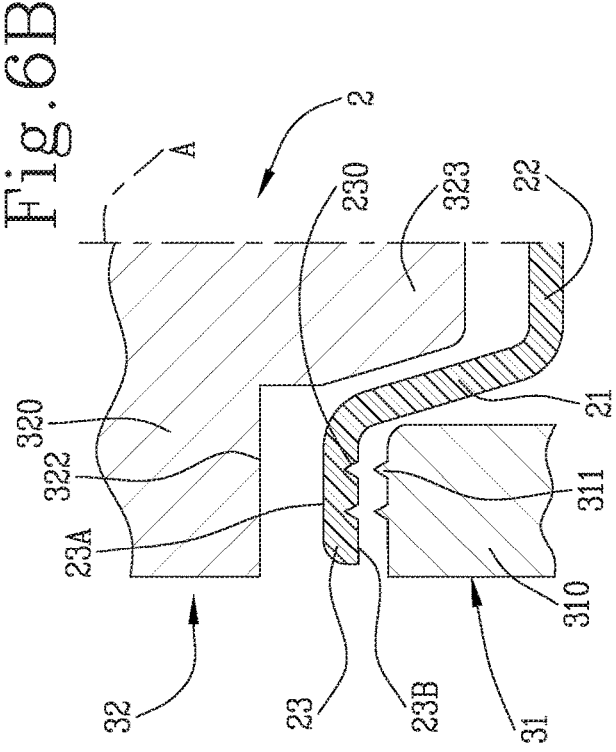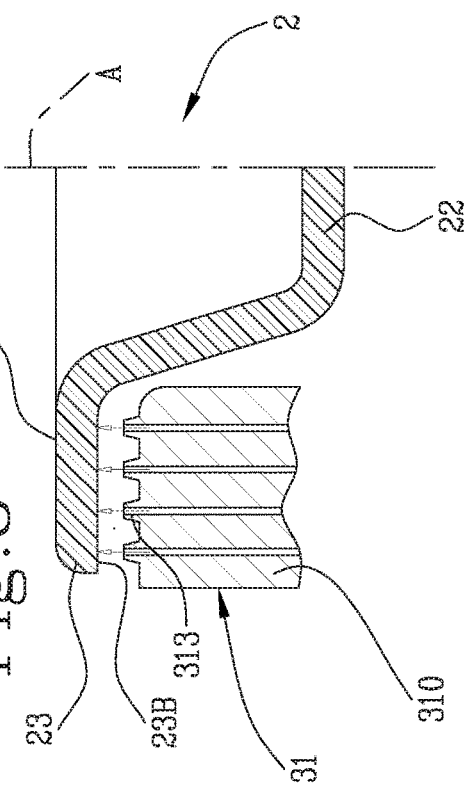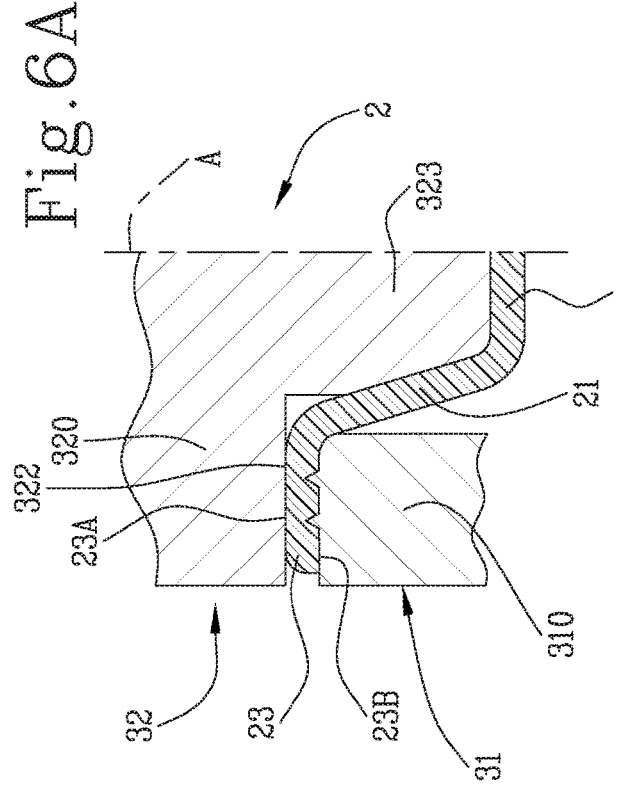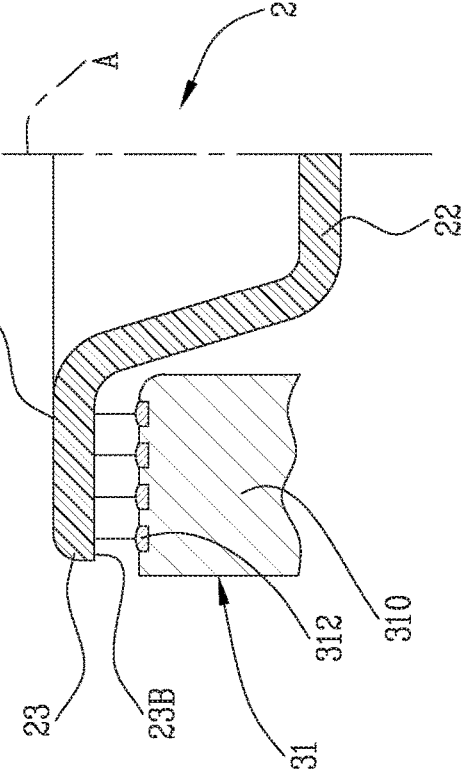

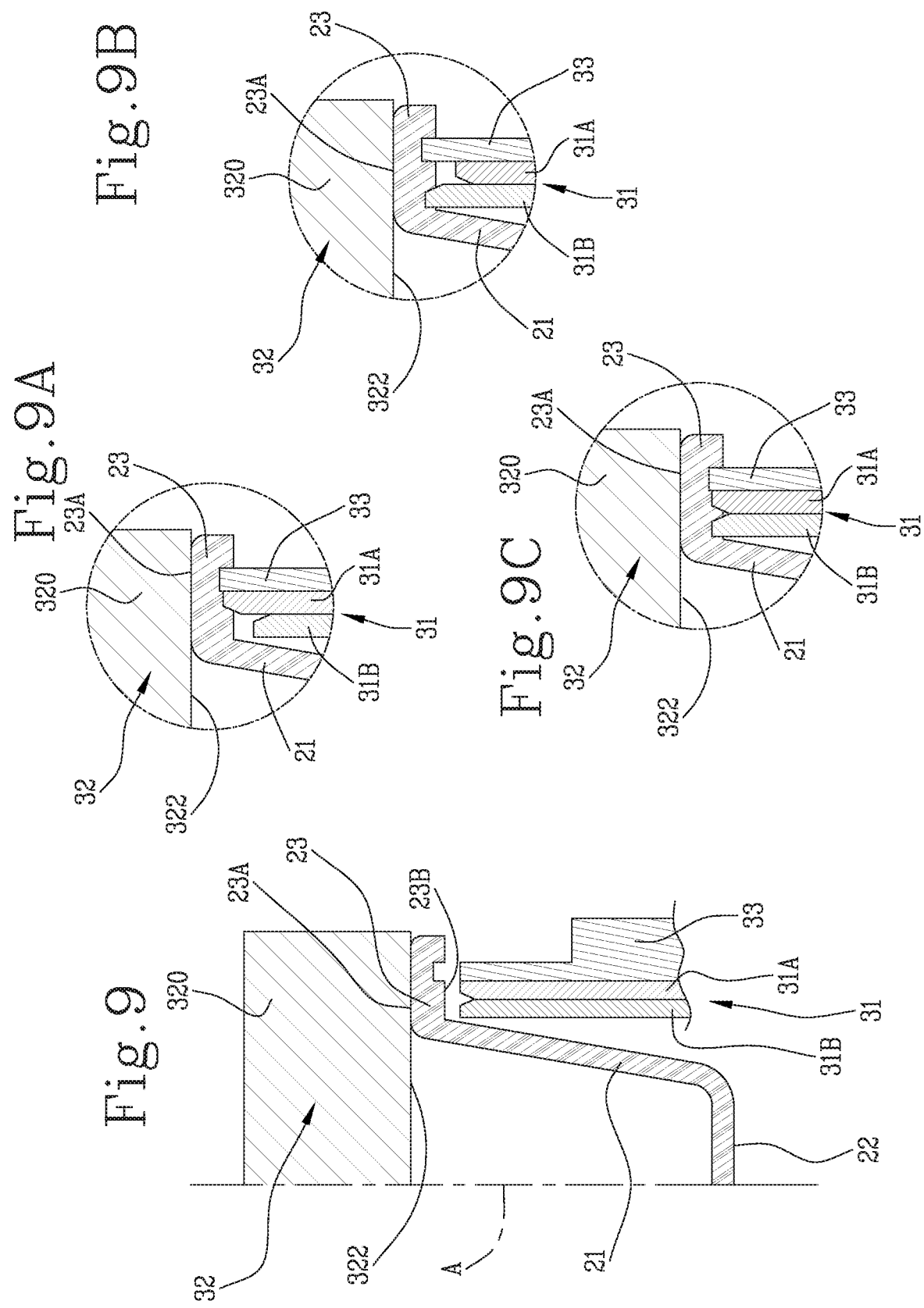

APPARATUS AND METHOD FOR PROCESSING CUPS

TECHNICAL FIELD

This invention relates to an apparatus and a method for processing plastic cups adapted, for example, to be filled with coffee and to be closed with respective lids to form coffee capsules.

BACKGROUND ART

Known in the sector of beverage production by infusion is the use of capsules containing infusion material such as coffee, for example. The capsules comprise a cup and a lid and are designed to be placed in specific beverage production machines where hot water or steam is fed into the capsule in order to brew the beverage.

In these beverage production machines, the capsule must be provided with an airtight seal which allows obtaining a pressurized environment. In many cases, the airtight seal is formed on an annular flange-like rim of the cup. Known in the prior art are several apparatuses and methods for forming the airtight seal on the annular flange-like rim of the capsules.

Patent documents WO2007/122208A1 and WO2016/007006A2 describe the production of a seal by injection moulding of a quantity of sealing material on a flange of a preformed capsule to form a sealing element attached to the capsule flange. Applying a quantity of sealing material on the capsule to make the seal has the disadvantage of complicating the production process, necessitating steps of preparing the quantity of sealing material, applying the material on the capsule and moulding the material, all of which results in longer process times and higher production costs.

Patent document WO2013046014A1 describes a solution in which the sealing element comprises a triangular protrusion projecting from the flanged rim and preferably formed as a single part as one with the capsule by injection moulding or thermoforming. In solutions of this kind, the production of the sealing element is fast but the geometry of the mould needed to obtain a sealing element of the required shape is necessarily complex. The complex geometry of the mould gives rise to several problems, including build-up of dirt in the mould, imprecision in the geometry obtained, difficulty of completely extracting the air resulting in the formation of air bubbles. Moreover, the sealing elements can be made in a very limited range of shapes because every shape requires a dedicated mould.

Patent document WO2016075321A1 proposes a solution in which the steps of forming and filling the capsule are followed by a step of applying a lid to the flanged rim of the capsule, during which the lid and the flanged rim are squeezed between a first and a second tool so as to deform the flanged rim (made at least partly of a polymeric material) to create a thick portion and a thin portion; the first and second tools are preferably heated. This solution has some disadvantages: first of all, after the forming step, the flanged rim cools down and is cold by the time it reaches the machine which applies the lid. Thus, to be able to deform it with a good degree of precision, it must be re-heated from a temperature close to ambient temperature (normally low) up to a temperature at which the plastic the flange is made of softens; this subsequent heating step involves consuming a non-negligible amount of energy. Moreover, the fact that the seal is made at the end of the capsule production process (that is to say, when the lid is applied) means that any fault in the production of a seal leads to the capsule with that seal being defective and makes it necessary to reject the entire full capsule (that is to say, not only the body of the capsule but also the beverage ingredients it contains and the lid).

DISCLOSURE OF THE INVENTION

The aim of this disclosure is to provide an apparatus and a method for processing a capsule intended for the production of a beverage in a beverage production device to overcome the above mentioned drawbacks of the prior art.

This aim is achieved by the apparatus, line and method of this disclosure as characterized in the appended claims.

The apparatus of this disclosure is directed to the processing of plastic cups adapted to be filled with a product. The cups are then closed by a lid applied to the cup to form the capsule. Once applied, the lid seals the product inside the capsule. In an embodiment, the cup (or at least the part of the cup that is operatively in contact with the lid) is stiffer than the lid; the lid may be flexible.

In a possible application, the product is solid (for example, in powder or granular form), or liquid or creamy. In a possible application, the product is a food product (solid, in powder or granular form, or creamy). In an application, the product is an infusion product; in this case, the capsule is intended to be inserted into a machine configured to make a beverage by interaction of a pressure element with the capsule to create a sealed environment. For example, the product may be coffee; hereinafter, reference is made to coffee capsules, for convenience of description, without thereby limiting the scope of the disclosure to coffee as the only product that can be filled into the capsules.

The cups may be made of plastic material (such as, for example, polymeric or composite materials) and/or metallic material (for example, aluminium). Each cup includes a containment body which extends between a bottom wall and an upper edge. Each cup also includes an annular flange (or flange-like rim) having a rear face, directed towards the containment body, and a front face, adapted to receive the lid to form the capsule. The annular flange is connected to the upper edge of the containment body. The annular flange extends radially from the containment body. The body of the cup thus defines a recess intended to be filled with coffee or other infusion material. The apparatus preferably comprises a plurality of pockets configured to receive (or house) the cups.

The pockets may include (or be in the form of) cavities into which the cups are inserted For example, they might be inserted with bottom wall of the cup resting on the bottom of the pocket; in this case, the cup received in the pocket is directed with the recess facing up (that is to say, the concavity defined by the body of the cup is directed upwards).

In addition, or alternatively, the pockets may include (or be in the form of) flat supporting surfaces to supportably receive the cups on corresponding surfaces; for example, the front face of the annular flange might be supported on the corresponding flat supporting surface of the respective pocket; in this case, the cup received in the pocket is directed with the recess facing down (that is to say, the concavity defined by the body of the cup is directed downwards).

The apparatus preferably comprises an infeed station configured to receive the cups (already formed) and to place them in respective pockets of the plurality of pockets.

The apparatus comprises at least one tool, configured to apply a process to the annular flange of a cup which is housed inside (or received in or supported on) a respective pocket of the plurality of pockets, so as to form a sealing profile. The expression "sealing profile" is used to mean a zone of the annular flange configured to create the seal when the capsule interacts with the pressure element in the coffee machine.

Preferably, the tool is configured to apply the process to the rear face of the annular flange of the cup. In effect, in the coffee machines in which the capsule will be used, the pressure element is (at least in one possible embodiment) responsible for coming into contact with the rear face of the annular flange. Nevertheless, in an embodiment, the at least one tool is configured to apply the process (also or only) on the front face of the annular flange of the cup. In effect, a process on the front face increases the elasticity of the annular flange so that when the pressure element of the coffee machine comes into contact with the rear face, it can deform the area and create a seal; in this case, too, a sealing profile is made.

In an embodiment, the at least one tool is configured to apply the process on both the rear face and the front face of the annular flange of the cup. That way, a rear sealing profile is created on the rear face and a front sealing profile is created on the front face.

In an embodiment, the process on the front face may also be useful to improve the quality of the lid seal; in effect, partializing the supporting surface increases the specific pressure and this has a positive effect on lid crimping. Thus, in an embodiment, the at least one tool is configured to form on the front face of the annular flange, a knurled zone suitable for welding the lid.

The apparatus preferably comprises an outfeed station configured to deliver the cups, with the sealing profile formed on them, to an outlet of the apparatus.

This disclosure thus provides an apparatus (that is, a machine) for processing preformed cups to make a sealing profile by processing the material of the flange of the cup itself. An apparatus of this kind has several advantages: thanks to the presence of one or more dedicated tools, it allows the flange to be processed with a good level of precision, creating a good quality sealing profile. Moreover, thanks to the apparatus of this disclosure, it is possible to make high-quality sealing profiles even with complex geometries; the quality is high even with different materials and/or colours; the apparatus thus offers great freedom in the design of the geometries themselves and in the modifying of the process features.

Furthermore, the moulding machine may be very simple and economical to create a cup with simple geometry (which can subsequently be post-formed by the apparatus of this disclosure to make a sealing profile with a complex geometry). It should be noted that this apparatus has a very limited cost compared to the moulding machine and the cost can be recovered from the saving on the complexity of the mould and on the flexibility of being able to change the geometry of the sealing zone without having to change the mould. In addition, the use of dedicated machinery allows separating the production of the sealing element spatially and temporally from the steps of moulding, filling and lid application, with considerable advantages in terms of process logistics: in effect, it allows greater flexibility and lowers the rejection rate (number of defective pieces). Moreover, the apparatus can be installed in line, after the moulding machine, so as to make the most of the temperature of the cup, which is still high, when the flange is still soft and easily deformable (without having to provide additional heat).

The apparatus preferably comprises a rotary carousel. The pockets of the plurality of pockets are preferably angularly spaced on the carousel (mounted on the carousel).

For each pocket of the plurality of pockets, the apparatus preferably comprises a respective tool, which rotates as one with the carousel and which is configured to apply a process to the rear face (or the front face) of the annular flange of the cup housed inside (or received in or supported on) the pocket. Thus, the at least one tool is mounted on the carousel. Preferably, each pocket mounted on the carousel is provided with a respective tool, configured to process the annular flange of the cup located in that pocket.

In an embodiment, the at least one tool is configured to apply a mechanical force on the rear face (or the front face) of the annular flange of the cup. The at least one tool has an annular shape so that it can interact with the annular flange of the capsule along the perimeter of the annular flange. In an embodiment, the at least one tool is configured to make the sealing element by moving the material of the annular flange. In an embodiment, the at least one tool includes a cavity which corresponds to a protrusion on the abutment element so that pressing the abutment element against the tool displaces (lowers) a part of the annular flange.

In an embodiment, the at least one tool is configured to make the sealing element by squeezing the material of the annular flange in such a way as to create a thinned zone and a thickened zone. In an embodiment, the at least one tool is configured to produce localized thinning by squeezing the annular flange between the at least one tool and a respective abutment element.

In an embodiment, the at least one tool includes a body (or main body) and one or more protrusions (or protuberances) extending from the body. In an embodiment, the body has an annular shape. In an embodiment, the one or more protrusions are annular in shape (for example, the tool has a plurality of protrusions shaped like concentric rings. The one or more protrusions define a shaped zone. The one or more protrusions are configured to thin the flange by penetrating the rear face thereof. In an embodiment, the at least one protrusion includes an angled surface.

In an embodiment, the apparatus comprises a corresponding abutment element associated with the at least one tool.

In an embodiment that comprises a plurality of tools (located in the plurality of pockets), the apparatus comprises a corresponding plurality of abutment elements.

In an embodiment, the at least one tool and the corresponding abutment element are movable between an open configuration, in which they are spaced apart, and a closed configuration, in which they are close together and the abutment element is in contact with the front face of the annular flange and the one or more protrusions of the at least one tool penetrate the annular flange, impressing the sealing profile therein. In an embodiment, the at least one tool comprises a respective actuator (for example, mechanical, hydraulic or pneumatic) to move it towards (and away from) the abutment element between the open configuration and the closed configuration. In an embodiment, the abutment element corresponding to the at least one tool comprises a respective actuator (for example, mechanical, hydraulic or pneumatic) to move it towards (and away from) the tool between the open configuration and the closed configuration. Thus, in an embodiment, the sealing profile is obtained by squeezing the flange between the tool and the abutment element so as to displace the material of the flange; more specifically, the protrusion (or the protrusions) of the tool cause localized thinning of the flange.

In an embodiment, the abutment element is radially symmetric about its axis of symmetry.

In an embodiment, the abutment element includes a contact surface configured to come into abutment against the front face of the flange. The contact surface is preferably planar (that is, flat). The abutment element has an annular shape so that it can interact with the annular flange of the capsule along the perimeter of the annular flange. In an embodiment, the abutment element includes a centring body projecting from the contact surface. In the closed configuration, the centring body at least partly enters the containment body of the cup, thus providing a centring effect on the cup. Preferably, the at least one tool includes a respective heating element configured to heat the at least one tool. The heating element may comprise electrical resistors located inside the tool. The heating element may comprise one or more ultrasonic emitters configured to cause the at least one tool (in contact with the annular flange) to vibrate. That way, the tool transmits heat to the annular flange (thus softening it and making it easier to process). In this embodiment, processing the flange to make the sealing element may include thermoforming.

In an embodiment, the abutment element comprises a respective heating element configured to heat the abutment element. The heating element may comprise electrical resistors located inside the abutment element. The heating element may comprise one or more ultrasonic emitters configured to cause the abutment element (in contact with the annular flange) to vibrate.

In an embodiment, for each pocket of the plurality of pockets, the apparatus comprises a heater configured to heat the annular flange of the cup located in the pocket. The heater may comprise a fan and one or more electrical resistors configured to heat the air and direct it towards the cup located in the pocket. The heater may comprise ultrasonic emitters configured to cause the pocket (hence the cup located in the pocket) to vibrate, thereby producing heat by friction. In this embodiment, processing the flange to make the sealing element may include thermoforming.

In other embodiments, the process used to obtain the sealing element from the flange is a cold process (performed without heating the flange, the tool or the abutment element).

In one embodiment, the apparatus comprises a control unit. The control unit is configured to control the at least one tool.

The control unit is preferably specific to the apparatus. Thus, the process performed on the flange by the apparatus can be controlled independently of the cup forming, filling and lid welding processes.

In an embodiment, the at least one tool includes a milling cutter configured to remove material from the rear face (or the front face) of the annular flange to form the sealing profile. In an embodiment, the milling cutter has an annular profile. In an embodiment, the milling cutter is movable along an annular path.

In an embodiment, the apparatus comprises ultrasonic emitting devices associated with the at least one tool. In an embodiment, the ultrasonic emitting devices are included in the tool (for example, in the body of the tool). The ultrasonic emitting devices are configured to heat the annular flange by causing the at least one tool, which is in contact with the annular flange, to vibrate.

In an embodiment, the apparatus comprises ultrasonic emitting devices associated with the at least one abutment element.

In an embodiment, the tool (or rather, each tool) includes a plurality of processing elements which can be activated selectively as a function of the type (shape) of sealing profile to be made.

In an embodiment, the processing elements may include laser emitters; in other embodiments, the processing elements may include jets of hot air or micro cutters, to give but some examples. Hereinafter, for simplicity of description, we refer to the example in which laser emitters are used without thereby intending to limit the scope of the disclosure.

In an embodiment, the laser emitters are associated with the at least one tool. In an embodiment, the laser emitters are disposed on a surface of the tool. The laser emitters are configured to emit laser rays on (directed at) the rear face of the annular flange. In an embodiment, the laser rays may be used to heat the flange prior to mechanical processing. The sealing profile might also be formed by a laser machining process.

In one embodiment, the apparatus comprises a control unit. The control unit is programmed to (selectively) switch on the laser emitters of the plurality of laser emitters. More specifically, the control unit is programmed to switch on a part of the plurality of emitters as a function of a user-set type of sealing profile. In an embodiment, the memory of the control unit contains a plurality of patterns corresponding to different types (shapes, forms) of the sealing profile and the control unit is configured to switch on the laser emitters along the pattern corresponding to the type of sealing profile selected by the user. In an embodiment, the apparatus comprises a die block (preferably fixed, i.e. not rotary) in which the pockets of the plurality of pockets are disposed. In an embodiment, the infeed station is configured to place the cups in the pockets on the die block. In an embodiment, the infeed station consists of an arm (or a plurality of arms) configured to place the cups in the pockets on the die block.

In an embodiment, the cups placed in the pockets are processed simultaneously. In effect, the apparatus comprises a tool (and preferably a respective abutment element) for each pocket. The tool may be defined by a single-impression moulding machine having a plurality of annular mouldings surrounding the pockets which accommodate the cups. The die block itself may define the tool. In an embodiment, the abutment elements are integrated in a counter-die block. In an embodiment, the control unit is programmed to move the counter-die block close to the die block so as to press the flanges against the tools (that is, the mouldings) of the die block. In an embodiment, the control unit is programmed to move the die block close to the counter-die block so as to press the flanges against the tools (that is, the mouldings) of the die block. That way, the sealing profile is made by creating an impression between the die block and the counter-die block.

In an embodiment, the outfeed station is configured to remove the cups from the pockets after the sealing profile has been formed. In an embodiment, the outfeed station consists of an arm (or a plurality of arms) configured to remove the cups from the pockets on the die block. In an embodiment, an arm (or a plurality of arms) has the function both of placing the cups in the die block and of removing them (hence, the infeed station and the outfeed station are integrated in a single arm/plurality of arms).

In an embodiment, the apparatus comprises a processing unit comprising the at least one tool. In an embodiment, the pockets of the plurality of pockets are movable relative to the processing unit (preferably on a conveyor belt). In an embodiment, the processing unit is configured to process the flange of one cup at a time, when the pocket containing the cup is located at (that is, passes by) a processing zone of the conveyor belt. For example, the at least one tool might comprise a first and a second tool, each configured to process one half (that is, a semicircle) of the rear face of the annular flange; the first and second tools are movable between an open position (spaced apart, where one is positioned on one side of the conveyor belt and the other on the opposite side) and a closed position (close together). The control unit is configured to keep the first and second tools at the open position while the conveyor belt moves and to bring them to the closed position when the conveyor belt stops, to allow the tools to come into contact with the cup to make the sealing profile. When the first and second tools are at the closed position, the control unit might also move an abutment element closer to bring it into contact with the front face of the annular flange; the abutment element may be configured to press the annular flange against the first and the second tool.

This disclosure also relates to a line for making coffee capsules.

In an embodiment, the line comprises a forming machine configured to form the cups. In an embodiment, the forming machine comprises a plurality of moulds defining forming cavities in which the cups are formed.

Preferably, the forming machine is configured to form the cups by compression moulding.

In an embodiment, the forming machine is configured to form the cups by injection moulding. In an embodiment, the forming machine is configured to form the cups by thermoforming. In an embodiment, the forming machine is configured to form the cups by injection compression moulding.

In an embodiment, the line comprises an apparatus for processing the cups (of the type described above).

In an embodiment, the line comprises a filling machine configured to fill the cups with coffee (and/or other ingredients for infusion beverages).

In an embodiment, the line is configured to transfer the cups from the forming machine to the apparatus for processing the cups.

In an embodiment, the line is configured to transfer the cups, with the sealing profile formed (released by an outfeed station of the apparatus for processing the cups) to an infeed station of the filling machine.

In an embodiment, the line comprises an applicator machine, configured to apply a lid to the front face of each cup to form a respective capsule. In an embodiment, the applicator machine comprises a welding device configured to weld the lid to the cup. In an embodiment, the welder also acts as an abutment for the at least one tool.

This disclosure also provides a method for processing plastic cups adapted to be filled with coffee and to be closed with respective lids to form coffee capsules.

In an embodiment, the method comprises a step of receiving the cups at an infeed station of an apparatus for processing the cups.

In an embodiment, the method comprises a step of placing the cups in respective pockets of the apparatus.

In an embodiment, the method comprises a step of applying a process to the rear face (or the front face) of the annular flange of a cup which is housed inside (or received in or supported on) a respective pocket of the plurality of pockets, so as to form a sealing profile. In an embodiment, the process is carried out by at least one tool of the apparatus.

In an embodiment, the method comprises a step of releasing the cups, with the sealing profile formed on them, to an outfeed station of an apparatus.

In an embodiment, during the step of applying the process, the at least one tool applies a mechanical force on the rear face (or the front face) of the annular flange of the cup. In an embodiment, the tool includes a main body and one or more protrusions which extend from the main body and which, during the step of applying the process, penetrate the annular flange, impressing the sealing profile therein.

In an embodiment, the tool includes a main body and one or more protrusions extending from the main body, and during the step of applying the process, the one or more protrusions move along an annular profile (by means of a specific actuator).

In an embodiment, during the step of applying the process, the tool comes into abutment against a respective abutment element.

In an embodiment, the abutment element and the tool associated therewith are movable between an open configuration, in which they are not in contact with the annular flange, and a closed configuration, in which the abutment element (with a contact surface of it) is in contact with the front face of the annular flange and the one or more protrusions of the tool penetrate the annular flange, impressing the sealing profile therein. In an embodiment, during the step of applying the process, the abutment element and the tool are in the closed configuration.

In an embodiment, the abutment element includes a contact surface, which, during the step of applying the process, comes into abutment against the front face of the flange, and a centring body which projects from the contact surface. In an embodiment, during the step of applying the process, the centring body at least partly enters the containment body of the cup, thus providing a centring effect on the cup.

In an embodiment, the sealing profile is formed by displacing the material of the flange. Displacement may be obtained by squeezing or by removal.

In an embodiment, the step of applying the process includes a step of removing material from the rear face (or the front face) of the annular flange to form the sealing profile (by means of a milling cutter).

In an embodiment, the method comprises a step of heating the at least one tool. In an embodiment, the step of heating the at least one tool precedes the step of applying the process. In an embodiment, the step of heating the at least one tool is simultaneous with the step of applying the process. In an embodiment, the step of heating the at least one tool comprises ultrasonic vibration of the at least one tool. In an embodiment, the step of heating the at least one tool comprises heating the at least one tool by means of electrical resistors.

In an embodiment, the method comprises a step of heating the annular flange of the cup located in the pocket. In an embodiment, the step of heating the annular flange precedes the step of applying the process. In an embodiment, the step of heating the annular flange is simultaneous with the step of applying the process. In an embodiment, the step of heating the annular flange of the cup comprises ultrasonic vibration of the cup.

In an embodiment, the method comprises a step of emitting ultrasounds which cause the at least one tool to vibrate. In an embodiment, the step of emitting ultrasounds follows the step of applying the process (so as to facilitate removing the tool). In an embodiment, the step of emitting ultrasounds precedes the step of applying the process (so as to heat the flange).

In an embodiment, the method comprises a step of emitting laser rays by means of a plurality of laser emitters associated with the at least one tool. In an embodiment, the step of emitting laser rays precedes the step of applying the process (so as to heat the flange). In an embodiment, the step of emitting laser rays is included in the step of applying the process.

In an embodiment, the method comprises a step of setting a sealing profile selected by the user. In an embodiment, the step of emitting laser rays comprises switching on a part of the plurality of emitters as a function of a user-set sealing profile.

In an embodiment, the method (that is, the step of applying the process) comprises a step of directing pressurized liquid at the annular flange in order to create the sealing profile.

BRIEF DESCRIPTION OF THE DRAWINGS

These and other features will become more apparent from the following detailed description of a preferred embodiment, illustrated by way of non-limiting example in the accompanying drawings, in which:

FIG. 1 shows an apparatus for processing cups according to this disclosure;

FIGS. 2A and 2B show a tool and a corresponding abutment element of a possible embodiment of the apparatus of FIG. 1 respectively in a closed configuration to impress a sealing profile on a cup and in an open configuration after the sealing profile has been formed;

FIGS. 3A and 3B, 4A and 4B, 5A and 5B, 6A and 6B show possible variant embodiments of the tool and of the corresponding abutment element of FIGS. 2A and 2B in the closed configuration and in the open configuration, respectively;

FIGS. 7, 8 and 9 show possible variant embodiments of the tool of the apparatus of FIG. 1;

FIGS. 9A, 9B and 9C show the tool of FIG. 9 in respective processing positions;

DETAILED DESCRIPTION OF PREFERRED EMBODIMENTS OF THE INVENTION

Figure 4A:
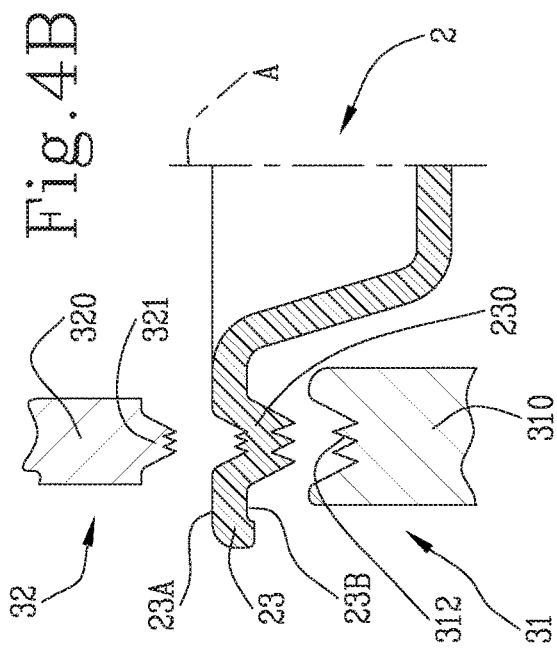
Figure 5A:
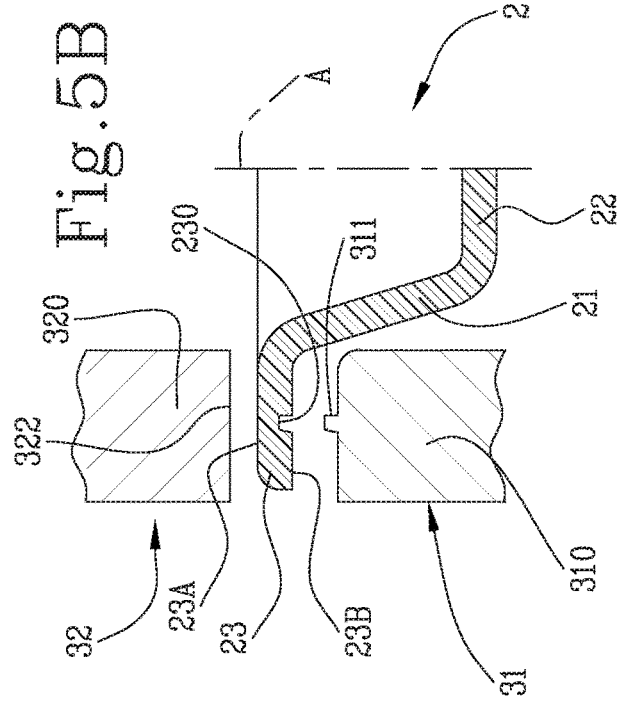
Figure 4B:
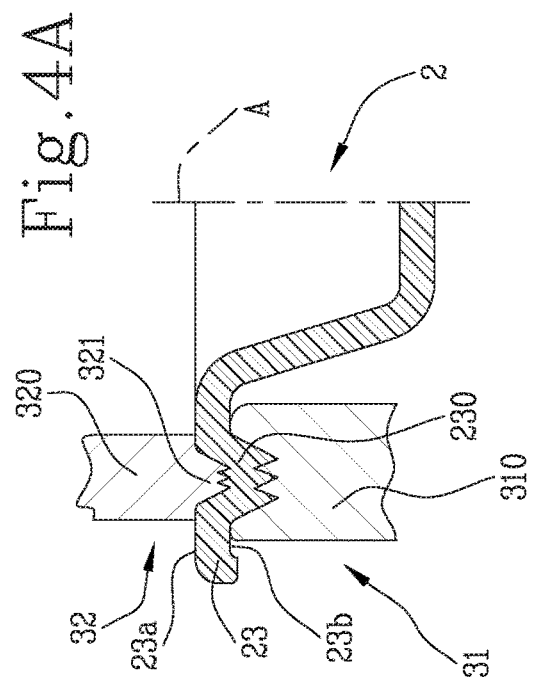
Figure 5B:
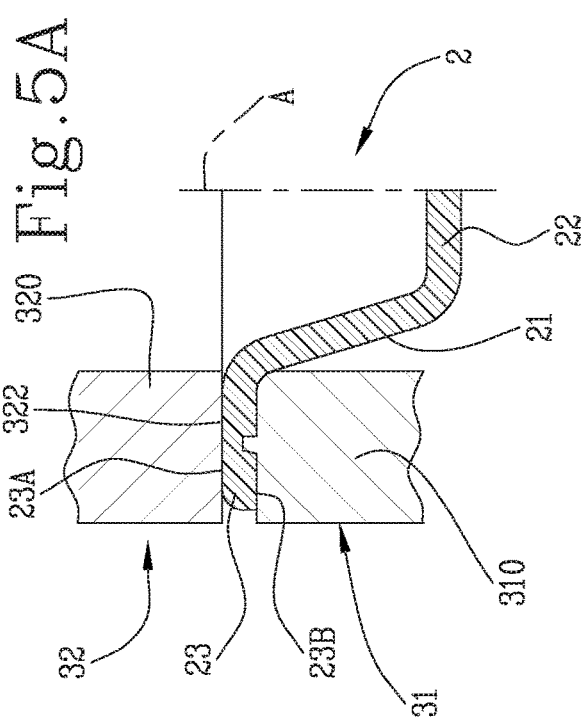
Figure 10A:
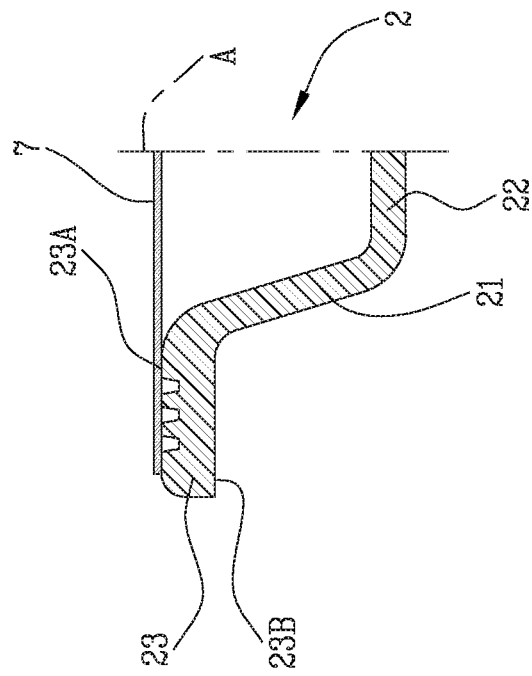
FIG. 10A shows a possible variant embodiment of the tool.
Figure 10B:
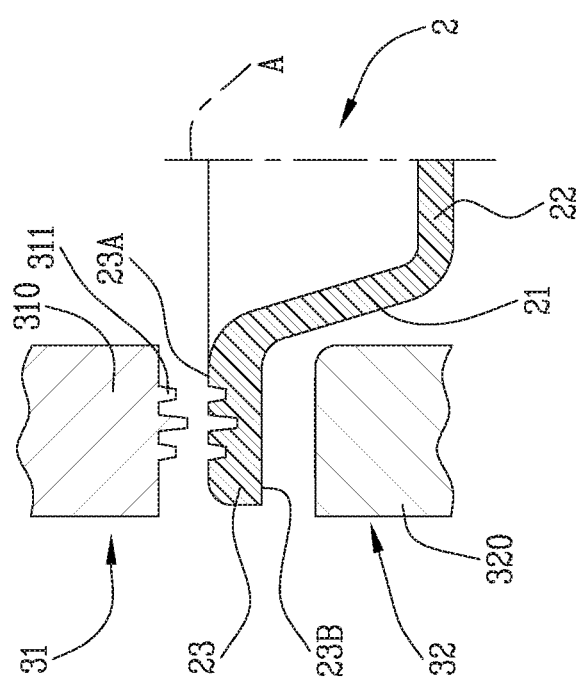
FIG. 10B shows the cup formed by the variant embodiment of FIG. 10A, with a lid applied thereon.
Figure 11:
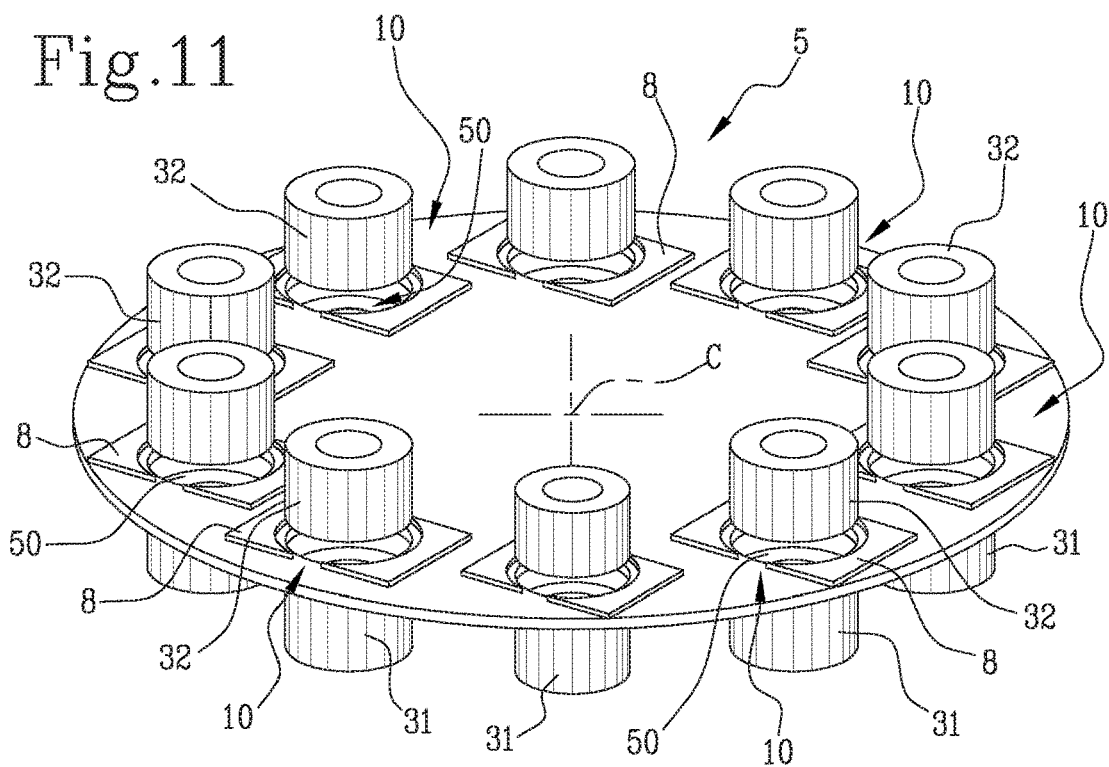
FIG. 11 shows a perspective view of a carousel of the apparatus of FIG. 1.
Figure 12:
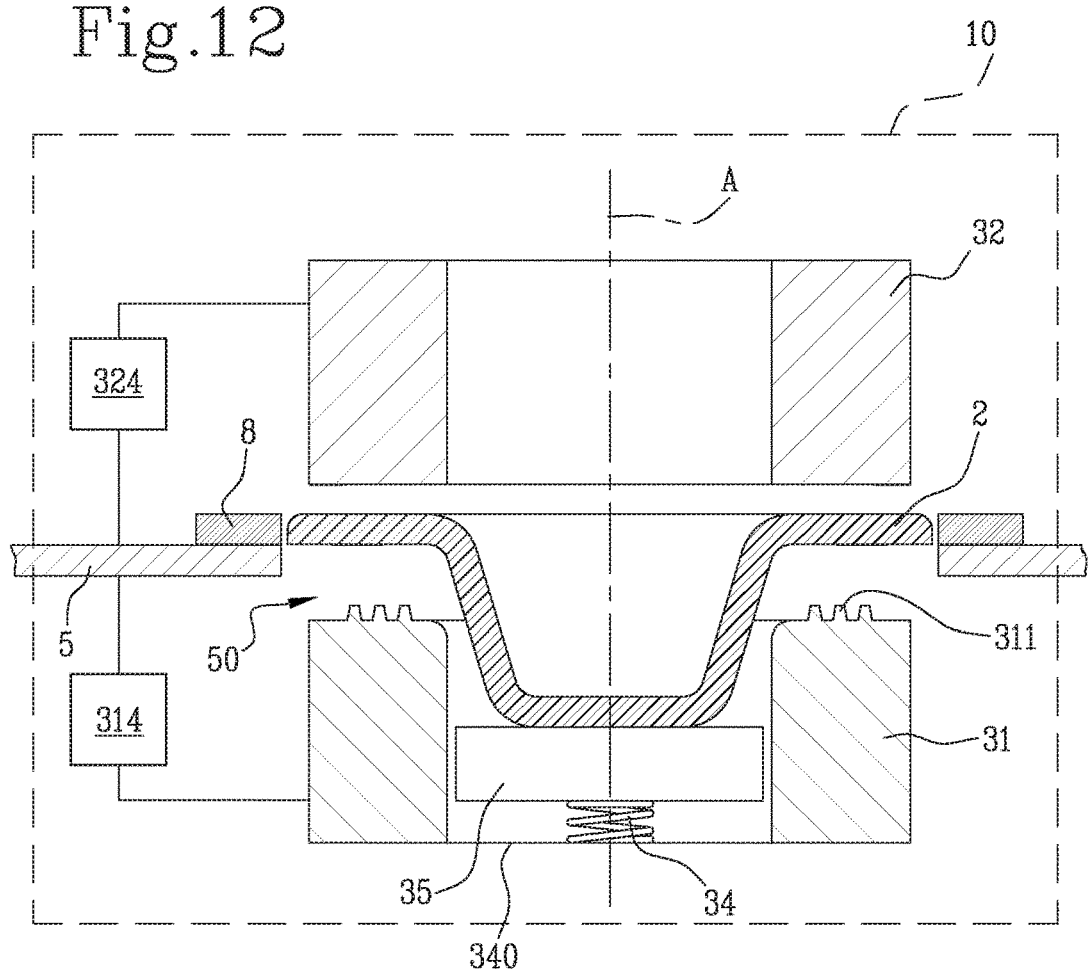
FIG. 12 shows an axial cross section of a pocket of the carousel of FIG. 11 with a cup housed therein.
Figure 13:
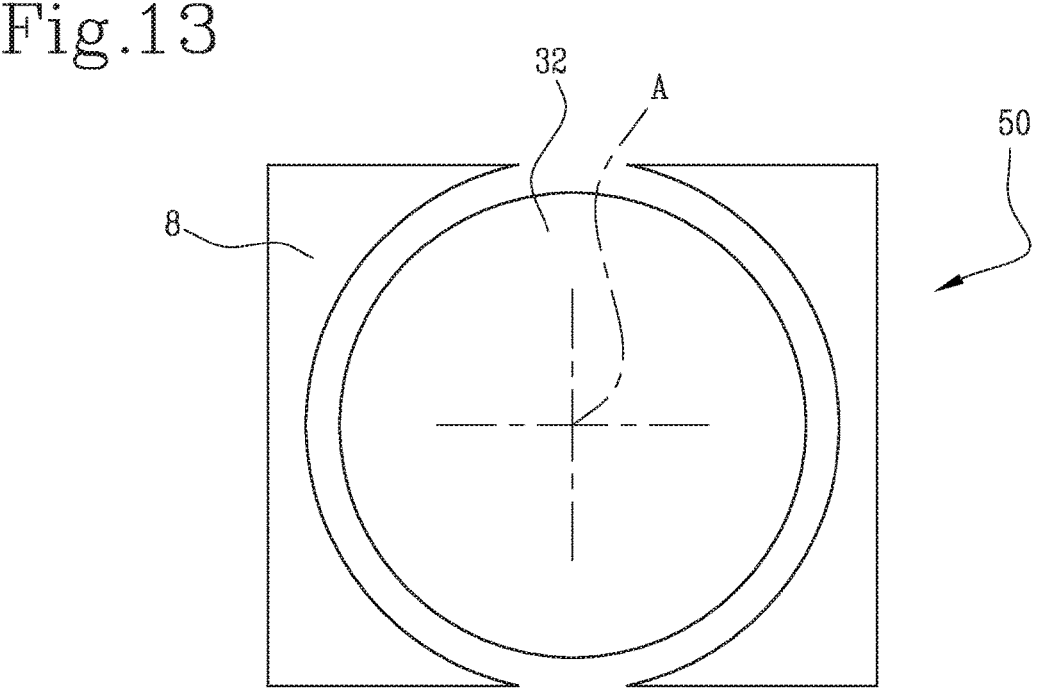
FIG. 13 shows a top view of a pocket of the carousel of FIG. 11.
Figure 14:
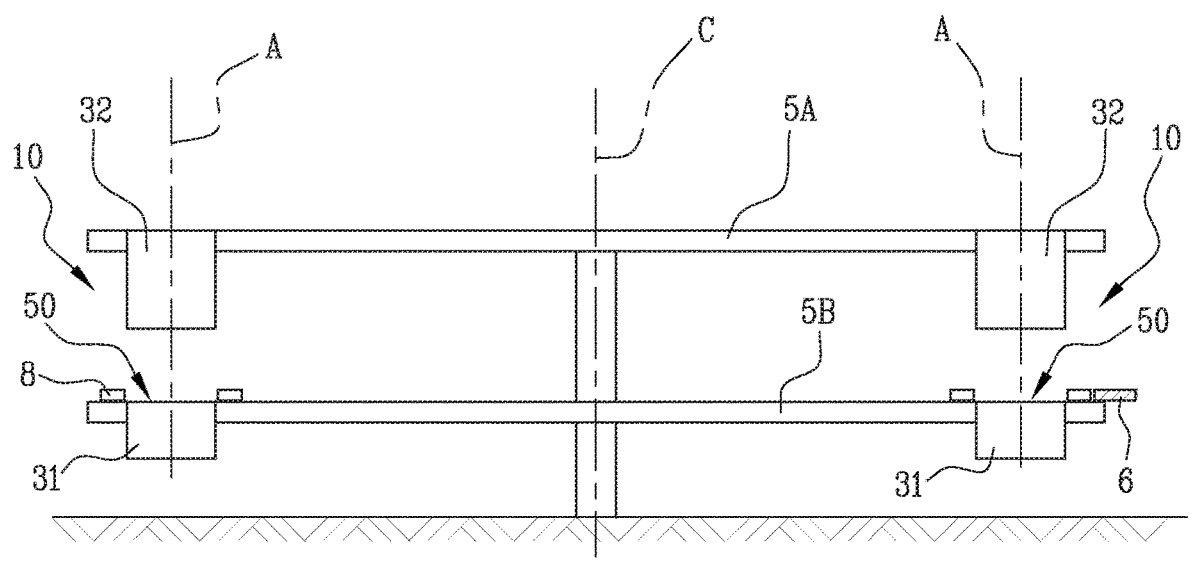
FIG. 14 shows a variant embodiment of the carousel of FIG. 11.
Figure 15:
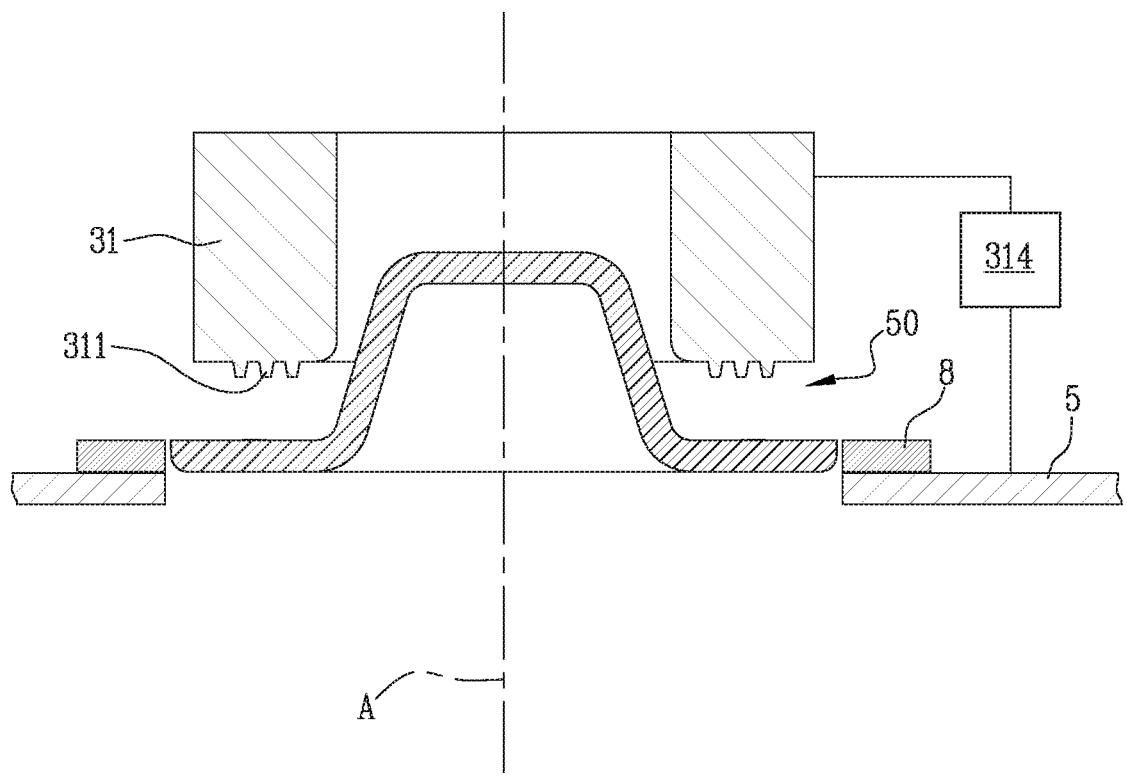
FIG. 15 shows a carousel pocket, with a cup housed inside it, in a possible variant embodiment.

With reference to the accompanying drawings, the numeral 1 denotes an apparatus for processing cups 2.

Each cup includes a containment body 21. Each cup includes a bottom wall 22. Each cup includes an annular flange or flange-like rim 23. The annular flange 23 extends around an axis A of the cup. The annular flange 23 has a rear face 23B facing towards the containment body 21. The annular flange 23 has a front face 23A opposite to the rear face 23B. The top face 23A is adapted to receive a lid 7 (after the cup has been filled) to form a capsule. In an embodiment, the apparatus 1 comprises a processing carousel 5. The apparatus 1 comprises a plurality of processing pockets 50, disposed on the processing carousel 5. Preferably, the pockets 50 are angularly equispaced on the processing carousel 5. The pockets 50 are configured to house the cups 2 during processing. The processing carousel 5 rotates about its axis of rotation C. For each processing pocket 50, the apparatus 1 comprises a respective processing station 10. The processing station 10 is configured to process a cup 2 housed in the corresponding pocket 50.

The apparatus 1 comprises an infeed station 4. In an embodiment, the infeed station 4 is structured like an infeed carousel. The infeed carousel rotates about its axis of rotation B. The infeed carousel comprises a plurality of insertion pockets 40. The infeed carousel is configured to feed the cups 2 to the processing carousel 5. Thus, the preformed cups 2 are fed to the insertion pockets 40 and from there to the pockets 50 of the processing carousel 5.

The apparatus 1 comprises an outfeed station 6. In an embodiment, the outfeed station 6 is structured like an outfeed carousel. The outfeed carousel rotates about its axis of rotation D. The outfeed carousel comprises a plurality of outfeed pockets 60. The outfeed carousel is configured to receive the cups 2, with the sealing profile formed on them, from the carousel 5. Thus, the cups 2 with the sealing profile formed on them are released from the pockets 50 of the processing carousel 5 and placed in the outfeed pockets 60.

For each pocket 50 of the processing carousel 5, the apparatus 1 comprises a respective tool 31 (the tool is preferably included in the processing station 10 corresponding to the pocket 50). The tool 31 is disposed in the respective pocket 50. The tool 31 rotates as one with the processing carousel 5 about its axis of rotation C.

In an embodiment, the tool 31 is configured to form a sealing profile 230 on the rear face 23B of the flange 23 of the cup 2 inside the respective pocket 50.

In an embodiment, the tool 31 is configured to form a sealing profile 230 on the front face 23A of the flange 23 of the cup 2 inside the respective pocket 50.

For each pocket 50 of the processing carousel 5, the apparatus 1 comprises a respective abutment element 32 (the abutment element 32 is preferably included in the processing station 10 corresponding to the pocket 50). The abutment element 32 is associated with the tool 31 of the respective pocket 50.

For each pocket 50 of the processing carousel 5, the apparatus 1 may also comprise a respective centring device 8, configured to facilitate centring the cup 2 in the pocket 50. The centring device 8 is connected to the carousel 5. In the embodiment illustrated, the centring device 8 defines a central cavity in which the cup 2 is housed. More specifically, the centring device 8 includes a first part and a second part, each of which delimits a half of the cavity the cup is housed in; the first part and the second part may be movable towards and away from each other.

In an embodiment, the tool 31 extends symmetrically about its axis of symmetry. In an embodiment, the tool 31 includes a body 310 (or main body).

In an embodiment, the tool 31 includes at least one protrusion (or protuberance) 311 projecting from the body 310. In an embodiment, the at least one protrusion 311, has an annular shape. In an embodiment, the at least one protrusion 311, has a broken annular profile. In an embodiment, the tool 31 includes a protrusion 311. In an embodiment, the tool 31 includes two protrusions 311 (spaced from each other). In an embodiment, the tool 31 includes three protrusions 311 (spaced from each other). In an embodiment, the tool 31 includes four protrusions 311 (spaced from each other). In an embodiment, the one or more protrusions 311 are triangular in shape. In an embodiment, the one or more protrusions 311 are trapezoidal in shape.

In an embodiment, the abutment element 32 comprises a body 320. In an embodiment, the abutment element 32 comprises a flat contact surface 322. The contact surface 322 is configured to come into contact with the top face 23A of the annular flange 23 (acting as an abutment for the tool 31).

In an embodiment, the tool 31 and the respective abutment element 32 are movable between an open configuration and a closed configuration. In the open configuration, the tool 31 and the respective abutment element 32 are spaced from each other. The open configuration is suitable for inserting the cup 2 into the pocket 50 and for removing the cup 2 from the pocket 50. In the closed configuration, the tool 31 and the respective abutment element 32 are close together: the abutment element 32 is in contact with the top surface 23A of the flange 23, while the at least one protrusion 311 of the tool 31 penetrates the rear face 23B of the flange 23, deforming it and impressing a sealing profile 230 in it. In an embodiment, the annular flange 23 has a thickened zone which the at least one protrusion 311 penetrates. In an embodiment, in the closed configuration, the flat contact surface 322 comes into contact with the front surface 23A without deforming it.

At least one between the tool 31 and the abutment element 32 is movable relative to the carousel 5 to be positioned between the open configuration and the closed configuration. More specifically, for each tool 31, the apparatus 1 comprises a respective actuator 314 (for example, a reduction gear motor) configured to move the tool 31 in parallel with the axis C of the carousel 5. Alternatively, or in addition, for each abutment element 32, the apparatus 1 may comprise a respective actuator 324 (for example, a reduction gear motor) configured to move the abutment element 32 in parallel with the axis C of the carousel 5.

In an embodiment, the tool 31 and the abutment element 32 are connected to the carousel 5 (that is, are mounted on the carousel); in this embodiment, the actuator 314 of the tool 31 and/or the actuator 324 of the abutment element are also mounted on the carousel 5.

In an embodiment, the carousel 5 comprises a top plate 5A, on which the abutment elements 32 are mounted, and a bottom plate 5B, on which the tools 31 are mounted; the top plate 5A is parallel to the bottom plate 5B and rotates about the same axis of rotation C. The tools 31 are movable relative to the bottom plate 5B, towards and away from the bottom plate 5B (by means of the actuator 314), and/or the abutment elements 32 are movable relative to the top plate 5A, towards and away from the top plate 5A (by means of the actuator 324), in addition or in alternative, the top plate 5A and the bottom plate 5B are movable relative to each other, towards and away from each other.

In an embodiment, each pocket 50 of the carousel 5 comprises a supporting element 35 to supportably receive the bottom wall 22 of the cup 2. In an embodiment, the supporting element 35 is connected by a spring 34 (also included in the pocket 50) to a supporting surface 340; the supporting element 35 is movable relative to the supporting surface 340 by means of the spring 34. That way, when the tool 31 moves away from the abutment element 32, the spring 34 pushes the cup out of the pocket 50. In the case where the carousel 5 includes a top plate 5A and a bottom plate 5B, the supporting element 35, the spring 34 and the supporting surface 340 are preferably connected to the bottom plate 5B. The tool 31 may be mounted on the supporting surface 340 fixedly or movably.

In an embodiment, the tool 31 includes a cavity 312 hollowed out in the main body 310.

In an embodiment, the abutment element 32 comprises at least one protrusion (or protuberance) 321 projecting from the body 320 of the abutment element 32 (that is, from the contact surface 322). In an embodiment, the abutment element 32 comprises a protuberance 321. In an embodiment, the at least one protrusion 321, has an annular shape. In an embodiment, the at least one protrusion 321, has a broken annular profile. In an embodiment, the abutment element 32 comprises two protuberances 321 (spaced from each other). In an embodiment, the abutment element 32 comprises three protuberances 321 (spaced from each other). In an embodiment, the abutment element 32 comprises four protuberances 321 (spaced from each other). In an embodiment, in the closed configuration, the one or more protrusions 321 of the abutment element 32 penetrate the front face 23A of the annular flange 23, impressing a shape therein.

In an embodiment, in the closed configuration, the one or more protrusions 321 of the abutment element push the material of the annular flange 323 into the cavity 312 of the tool, creating the sealing profile 320 by displacing the material of the annular flange.

In an embodiment, the abutment element 32 is radially symmetric about its axis of symmetry. In an embodiment, the abutment element 32 comprises a centring body 323 projecting from the contact surface 322 (and from the body 320). In an embodiment, the centring body 323 in the closed configuration (at least partly) enters the containment body 21 of the cup 2. That way, the centring body 323 provides a centring effect on the cup 2 in the pocket 50 such that the axis A of the cup 2 is made to correspond to the axis of symmetry of the abutment element 32 and to the axis of symmetry of the tool 31.

In an embodiment, tool 31 comprises a first part 31A and a second part 31B. In an embodiment, the tool 31 comprises a plurality of parts. In an embodiment, each part 31A, 31B is movable independently towards and away from the flange 23. In an embodiment, the control unit is programmed to activate (that is, move to the closed configuration) only the first part 31A or only the second part 31B or both the first and the second part 31A and 31B in succession, depending on the geometry of the sealing profile 230 required. Dividing the tool into two or more parts allows a high level of flexibility in the production of the sealing profiles: in particular, it allows easily varying the geometry and making the complex geometries with a good degree of precision.

In an embodiment, the apparatus comprises a centring tool 33 for each pocket. The centring tool 33 may be provided alternatively to, or in combination with, the centring device 8. In an embodiment, the centring tool 33 has an annular shape. In an embodiment, the centring tool 33 surrounds the tool 31.

In an embodiment, the control unit is programmed to activate the centring tool 33 first (to bring it into contact with the flange 23) and then the tool 31. In an embodiment, the centring tool 33 surrounds the first part 31A of the tool 31 and the first part surrounds the second part 31B. In an embodiment, the control unit is programmed to activate the centring tool 33 first (to bring it into contact with the flange 23) and then to activate the first part 31A (followed, if necessary, by the second part 31B). In an embodiment, the control unit is programmed to activate the centring tool 33 first (to bring it into contact with the flange 23) and then to activate the second part 31B (followed, if necessary, by the first part 31A). In an embodiment, the control unit is programmed to activate the centring tool 33 first (to bring it into contact with the flange 23) and then to activate the first part 31A and the second part 31B simultaneously.

In an embodiment, the tool 31 comprises a plurality of laser emitters 312. In an embodiment, the tool 31 is configured to make the sealing profile 230 by optical processing of the rear face 23B of the flange 23. In an embodiment, the tool 31 is configured to make the sealing profile 230 by optical processing of the front face 23A of the flange 23.

In an embodiment, the tool 31 comprises a plurality of nozzles 313. In an embodiment, the tool 31 is configured to make the sealing profile 230 by directing pressurized liquid at the rear face 23B of the flange 23. In an embodiment, the tool 31 is configured to make the sealing profile 230 by directing pressurized liquid at the front face 23A of the flange 23. In an embodiment, the control unit activates a part of the nozzles 313 as a function of the shape of the sealing profile 230 required.

The following paragraphs, listed in alphanumeric order for reference, are non-limiting example modes of describing this invention.

A000. An apparatus for processing plastic cups adapted to be filled with a product and to be closed with respective lids to form capsules, wherein each cup includes a containment body, which extends between a bottom wall and an upper edge, and an annular flange having a rear face, directed towards the containment body, and a front face, adapted to receive the lid to form the capsule, the apparatus comprising:
at least one pocket, configured to receive (or house) the cup;
at least one tool, configured to apply a process to at least the rear face or the front face of the annular flange of a cup received (or housed) in the pocket, so as to form a sealing profile.

A00. The apparatus of paragraph A000, comprising a plurality of pockets configured to receive (or house) a corresponding plurality of cups.

A0. The apparatus of paragraph A000 or paragraph A00, comprising an infeed station configured to receive the cups (or the cup) and to place them in (or support them on) respective pockets of the plurality of pockets (or in the at least one pocket).

A. The apparatus of any one of paragraphs from A000 to A0, comprising an outfeed station configured to deliver the cups (or the cup), with the sealing profile formed on them, to an outlet of the apparatus.

A1. The apparatus of any one of paragraphs from A000 to A, wherein the at least one tool is configured to apply a mechanical force on the rear face of the annular flange of the cup.

A1.1. The apparatus of any one of paragraphs from A000 to A1, wherein the at least one tool is configured to apply a mechanical force on the front face of the annular flange of the cup.

A2. The apparatus of any one of paragraphs from A000 to A1.1, comprising, for each tool, a respective abutment element associated with the tool.

A2.1. The apparatus of paragraph A2, wherein the abutment element is radially symmetric about its axis of symmetry.

A2.2. The apparatus of paragraph A2 or of paragraph A2.1, wherein the abutment element includes a centring body.

A2.3. The apparatus of any one of paragraphs from A2 to A2.2, wherein the tool includes a main body and one or more protrusions which extend from the main body.

A2.3.1. The apparatus of paragraph A2.3, wherein the one or more protrusions are radially symmetrical.

A2.3.1.1. The apparatus of paragraph A2.3.1, wherein the one or more protrusions have an annular profile.

A2.3.2. The apparatus of paragraph A2.3 or of paragraph A2.3.1.1, wherein the one or more protrusions are movable along an annular profile (by means of a specific actuator).

A2.3.3. The apparatus of any one of paragraphs from A2.3 to A2.3.2, wherein the abutment element and the tool associated therewith are movable between an open configuration, in which they are not in contact with the annular flange, and a closed configuration, in which the abutment element (with a contact surface of it) is in contact with the front face of the annular flange and the one or more protrusions of the tool penetrate the annular flange, impressing the sealing profile therein.

A2.3.3.1. The apparatus of paragraph A2.3.3, wherein the abutment element includes a contact surface, configured to come into abutment against the front face of the flange, and a centring body which projects from the contact surface and which, in the closed configuration, at least partly enters the containment body of the cup, thus providing a centring effect on the cup.

A2.3.4. The apparatus of any one of paragraphs from A2.3 to A2.3.3.1, wherein the tool is configured to make the sealing profile by squeezing the material of the flange.

A2.4. The apparatus of any one of paragraphs from A2 to A2.3.4, wherein the tool includes a main body and a cavity made in the main body, and wherein the abutment element includes at least one main body and at least one protrusion projecting from the main body and configured to displace the material of the flange inside the cavity, thereby impressing the sealing profile.

A2.4.1 The apparatus of paragraph A2.4, wherein the one or more protrusions of the abutment element and the cavity of the tool are radially symmetrical.

A2.4.1.1. The apparatus of paragraph A2.4.1, wherein the one or more protrusions of the abutment element and the cavity of the tool have an annular profile.

A2.4.2. The apparatus of paragraph A2.4 or of paragraph A2.4.1.1, wherein the one or more protrusions of the abutment element are movable along an annular profile (by means of a specific actuator).

A2.4.3. The apparatus of any one of paragraphs from A2.4 to A2.4.2, wherein the abutment element and the tool associated therewith are movable between an open configuration, in which they are not in contact with the annular flange, and a closed configuration, in which the abutment element (with a contact surface of it) is in contact with the front face of the annular flange and the one or more protrusions of the tool cause a displacement of the material of the annular flange, thereby impressing the sealing profile therein.

A2.4.3.1. The apparatus of paragraph A2.4.3, wherein the abutment element includes a contact surface, configured to come into abutment against the front face of the flange, and a centring body which projects from the contact surface and which, in the closed configuration, at least partly enters the containment body of the cup, thus providing a centring effect on the cup.

A2.4.4. The apparatus of any one of paragraphs from A2.4 to A2.4.3.1, wherein the tool is configured to make the sealing profile by displacing the material of the flange.

A3. The apparatus of any one paragraphs A2 to A2.4.4, comprising a circuit (hydraulic or pneumatic) to move the at least one tool and the respective abutment element between the open position and the closed position.

A4. The apparatus of any one of paragraphs from A000 to A3, wherein the at least one tool is heated.

A4.1. The apparatus of paragraph A4 wherein the at least one tool includes a respective heating element.

A4.1.1. The apparatus of paragraph A4.1, wherein the heating element includes one or more electrical resistors integrated in a body of the tool.

A4.2. The apparatus of paragraph A4 or of paragraph A4.1, comprising, for each tool, one or more ultrasonic emitters configured to cause the at least one tool to vibrate (so as to heat it by ultrasonic vibrations).

A5. The apparatus of any one of paragraphs from A000 to A4.2, comprising, for each pocket (or for the at least one pocket), a heater configured to heat the flange on the cup received (or housed) in the pocket.

A5.1. The apparatus of paragraph A5, wherein the heater comprises a plurality of electrical resistors for heating the air, and a fan configured to direct the heated air at the flange on the cup.

A5.2. The apparatus of paragraph A5 or of paragraph A5.1, wherein the heater comprises one or more ultrasonic emitters configured to cause the cup to vibrate (so as to heat it by ultrasonic vibrations).

A6. The apparatus of any one of paragraphs from A000 to A5.2, comprising a control unit configured to control the at least one tool.

A6.1. The apparatus of paragraph A6, wherein the control unit is preferably specific to the apparatus.

A7. The apparatus of any one of paragraphs from A000 to A6.1, wherein the at least one tool includes a milling cutter configured to remove material from the rear face of the annular flange to form the sealing profile.

A7.1. The apparatus of paragraph A7, wherein the milling cutter includes an annular milling cutter profile to make an annular sealing profile.

A7.2. The apparatus of paragraph A7 or of paragraph A7.1, wherein the milling cutter includes a milling cutter bit movable along an annular path to make an annular sealing profile.

A7.3. The apparatus of any one of paragraphs from A7 to A7.2, wherein the milling cutter rotates about its axis of rotation (by means of a specific actuator).

A8. The apparatus of any one of paragraphs from A000 to A7.3, comprising ultrasonic emitters associated with the at least one tool and configured to cause the at least one tool to vibrate.

A9. The apparatus of any one of paragraphs from A to A8, comprising, in each pocket (or in the at least one pocket) a plurality of laser emitters associated with the at least one tool.

A9.1. The apparatus of paragraph A9, comprising a control unit programmed to switch on the laser emitters of the plurality of laser emitters, the control unit being configured to switch on a part of the plurality of emitters as a function of a user-set type of sealing profile.

A9.1.1. The apparatus of paragraph A9, wherein the control unit contains in its memory one or more patterns corresponding to shapes for processing the annular flange and is programmed to receive a signal from a user to select a processing shape and to drive the laser emitters to emit laser rays according to the pattern corresponding to the processing shape selected by the user.

A10. The apparatus of any one of paragraphs from A000 to A9.1.1, wherein the tool comprises a plurality of nozzles connected to a pressurized liquid tank and configured to direct the pressurized liquid at the annular flange to form the sealing profile.

A11. The apparatus of any one of paragraphs from A000 to A10, wherein the at least one tool comprises a plurality of parts, wherein each part of the plurality of parts is movable towards and away from the flange independently of the other parts of the plurality of parts.

A11.1. The apparatus of paragraph A11, wherein the plurality of parts is made up of a first part and a second part.

A11.2. The apparatus of paragraph A11 or of paragraph A11.1, wherein the parts are annular in shape and are concentric with each other.

A11.3. The apparatus of any one of paragraphs from A11 to A11.2, comprising a control unit programmed to activate one or more parts of the plurality of parts in a predetermined sequence as a function of a required sealing profile shape.

A12. The apparatus of any one of paragraphs from A000 to A10, wherein the apparatus is built into a forming machine, wherein the forming machine is configured to form the cups from respective quantities of material or preforms.

A12.1. The apparatus of paragraph A12, wherein the forming machine includes a plurality of moulds configured to form respective cups and wherein the at least one tool (and, if present, the respective abutment element) is built into the mould.

A12.1.1. The apparatus of paragraph A12.1, wherein the at least one tool is configured to protrude telescopically from the walls of the mould to impress the sealing profile.

A12.1.1.1. The apparatus of paragraph A12.1.1, comprising a control unit programmed to drive the at least one tool (and, if present, the respective abutment element) to protrude telescopically from the walls of the mould once the cup has been formed.

A12. The apparatus of any one of paragraphs from A000 to A12.1.1.1, comprising at least one centring tool having an annular shape.

A12.1. The apparatus of paragraph A12, wherein the at least one centring tool surrounds the at least one tool.

A12.1. The apparatus of paragraph A12, comprising a control unit programmed to activate the at least one centring tool (bringing it into contact with the flange) before activating the at least one tool.

A13. The apparatus of any one of paragraphs from A000 to A12.1.1.1, comprising an outfeed station configured to deliver the formed capsules to an outlet of the apparatus.

A13.1. The apparatus of paragraph A13, wherein the apparatus is built into a lid applicator machine configured to apply a lid to the cup to form the capsule.

A13.1.1. The apparatus of paragraph A13.1 wherein the lid applicator machine comprises a welder configured to weld the lid to the cup and wherein the welder also acts as an abutment element for the at least one tool.

A14. The apparatus of any one of paragraphs from A00 to A13.1.1, comprising a rotary carousel, wherein the pockets of the plurality of pockets (or the at least one pocket) are angularly spaced on the carousel.

A14.1. The apparatus of paragraph A14, including, for each pocket of the plurality of pockets, a respective rotary tool which rotates as one with the carousel and which is configured to apply a process to the rear face of the annular flange of the cup received (or housed) in the pocket.

A15. The apparatus of any one of paragraphs from A000 to A13.1.1, comprising a die block in which the pockets of the plurality of pockets are disposed.

A15.1. The apparatus of paragraph A15, wherein the die block is fixed.

A15.2. The apparatus of paragraph A15 or of paragraph A15.1, including a respective tool for each pocket of the plurality of pockets, wherein the tools of all the pockets of the plurality of pockets are configured to apply the processes simultaneously on all the cups received (or housed) in the respective pockets of the plurality of pockets.

A16. The apparatus of any one of paragraphs from A000 to A13.1.1, comprising a processing unit comprising the at least one tool, wherein the pockets of the plurality of pockets (or the at least one pocket) are movable relative to the processing unit.

A16.1. The apparatus of paragraph A16, including a conveyor belt, wherein the pockets of the plurality of pockets (or the at least one pocket) are movable on the conveyor belt.

A16.1.1. The apparatus of paragraph A16.1, wherein the processing unit is configured to process one flange at a time when the respective pocket is in a processing zone of the conveyor belt.

B00. A line for making capsules, comprising:
 a forming machine configured to form plastic cups, wherein each cup includes a containment body, which extends between a bottom wall and an upper edge, and an annular flange having a rear face, directed towards the containment body, and a front face, opposite to the rear face;
 an apparatus (1) for processing the plastic cups (2) according to any one of the preceding paragraphs.

B0. The line of paragraph B00, comprising a filling machine, configured to fill the cups with a product; the product may, depending on the application, be coffee or other infusion product, or other solid, liquid or creamy food product, or other type of product (for example a drug).

B. The line of paragraph B0 or of paragraph B00, comprising an applicator machine, configured to apply a lid to the front face of each cup to form a respective capsule.

B1. The line of any one of paragraphs from B00 to B, wherein the forming machine comprises:
 a plurality of pockets configured to receive (or house) the cups;
 at least one tool, configured to apply a process to the rear face of the annular flange of a cup received (or housed) in a respective pocket of the plurality of pockets (or in the at least one pocket), so as to form a sealing profile.

B1.1. The line of paragraph B1, comprising, in the pockets (or in the at least one pocket) respective moulds (or one mould) for forming the capsules and (for each pocket) a tool having a rest position, where it is retracted within the mould, and a working position, where it projects telescopically from the mould.

B1.2. The line of paragraphs B1 and B1.1, wherein the line is configured to transfer the cups, with the sealing profile formed on them and released by the outfeed station of the forming machine, to an infeed station of the filling machine.

B2. The line of any one of paragraphs from B00 to B1.2, wherein the line is configured to transfer the cups, with the sealing profile formed on them and released by the outfeed station of the apparatus for processing the cups, to an infeed station of the filling machine.

B3. The line of any one of paragraphs from B00 to B1.2, wherein the applicator machine comprises:
 a plurality of pockets configured to receive (or house) the cups;
 at least one tool, configured to apply a process to the rear face of the annular flange of a cup received (or housed) in a respective pocket of the plurality of pockets so as to form a sealing profile.

B3.1. The line of paragraph B3, comprising a welder configured to weld the lid to the front face of the cup and wherein the welder also acts as an abutment element for the at least one tool.

B3.1.1. The line of paragraph B3.1, comprising a control unit programmed to move the welder and the at least one tool (preferably simultaneously) from a rest position, in which they are spaced from the cup, to a working position, in which the welder is in contact with the front face of the cup and the at least one tool is in contact with the rear face of the cup in order to make a sealing profile on the rear face of the cup.

B4. The line of any one of paragraphs from B00 to B3.1.1, wherein the forming machine is configured to form the cups by compression moulding.

B5. The line of any one of paragraphs from B00 to B3.1.1, wherein the forming machine is configured to form the cups by injection moulding.

B6. The line of any one of paragraphs from B00 to B3.1.1, wherein the forming machine is configured to form the cups by thermoforming.

B7. The line of any one of paragraphs from B00 to B3.1.1, wherein the forming machine is configured to form the cups by injection compression moulding.

C000. A method for processing plastic cups adapted to be filled with a product and to be closed with respective lids to form capsules, wherein each cup includes a containment body, which extends between a bottom wall and an upper edge, and an annular flange having a rear face, directed towards the containment body, and a front face, adapted to receive the lid to form the capsule, the method comprising the following steps:
 placing the cup in at least one pocket of the apparatus;
 applying a process to at least the rear face or the front face of the annular flange of a cup received (or housed) in the at least one pocket, so as to form a sealing profile by means of at least one tool.

C00. The method of paragraph C000, wherein during the step of placing, a plurality of cups are placed in a respective plurality of pockets of the apparatus, in which the process is applied.

C0. The method of paragraph C000 or of paragraph C00, comprising a step of receiving the cups and placing them in respective pockets of the plurality of pockets (or in the at least one pocket) by means of an infeed station of the apparatus.

C. The method of any one of paragraphs from C000 to C0, comprising a step of extracting the cups from the pockets of the plurality of pockets (or the cup from the at least one pocket) by means of an outfeed station of the apparatus.

C1. The method of paragraph C000 or of paragraph C, wherein, during the step of applying the process, the at least one tool applies a mechanical force on the rear face of the annular flange of the cup.

C1.1. The method of paragraph C000 or of paragraph C1, wherein, during the step of applying the process, the at least one tool applies a mechanical force on the front face of the annular flange of the cup.

C2. The method of any one of paragraphs from C000 to C1, wherein, during the step of applying the process, the tool comes into abutment against a respective abutment element.

C2.1. The method of paragraph C2, wherein the tool includes a main body and one or more protrusions extending from the main body, and during the step of applying the process, the one or more protrusions are movable along an annular profile (by means of a specific actuator).

C2.2. The method of paragraph C2 or of paragraph C2.1, wherein the abutment element and the tool associated therewith are movable between an open configuration, in which they are not in contact with the annular flange, and a closed configuration, in which the abutment element (with a contact surface of it) is in contact with the front face of the annular flange and the at least one tool is in contact with the rear face of the annular flange, impressing the sealing profile, wherein during the step of applying the process, the abutment element and the tool are in the closed configuration.

C2.2.2. The method of paragraph C2.2 wherein the abutment element includes a contact surface, which, during the step of applying the process, comes into abutment against the front face of the flange, and a centring body which projects from the contact surface and which, during the step of applying the process, at least partly enters the containment body of the cup to provide a centring effect on the cup.

C3. The method of any one of paragraphs from C000 to C2.2.2, wherein the tool forms the sealing profile (during the step of applying the process) by squeezing the material of the flange.

C3.1. The method of paragraph C3, wherein the tool includes a main body and one or more protrusions which extend from the main body and which, during the step of applying the process, penetrate the annular flange, impressing the sealing profile therein.

C30. The method of any one of paragraphs from C000 to C2.2.2, wherein the tool forms the sealing profile (during the step of applying the process) by displacing the material of the flange.

C30.1. The method of paragraph C30, wherein the tool includes a cavity formed in the main body and wherein the abutment element includes at least one protrusion which, during the step of applying the process (with the tool and the abutment element in the closed configuration), causes the material of the annular flange to be displaced in the hollow, thereby impressing the sealing profile therein.

C4. The method of any one of paragraphs from C000 to C3.1, comprising a step of heating the at least one tool.

C4.1. The method of paragraph C4, wherein the step of heating the at least one tool precedes (or is simultaneous with) the step of applying the process.

C4.2. The method of paragraph C4 or of paragraph C4.1, wherein the step of heating the at least one tool comprises ultrasonic vibration of the at least one tool.

C5. The method of any one of paragraphs from C000 to C4.1, comprising a step of heating the annular flange of the cup received (or housed) in the pocket.

C5.1. The method of paragraph C5, wherein the step of heating the annular flange of the cup precedes (or is simultaneous with) the step of applying the process.

C5.2. The method of paragraph C5 or of paragraph C5.1, wherein the step of heating the annular flange of the cup comprises ultrasonic vibration of the cup.

C7. The method of any one of paragraphs from C000 to C5.2, wherein the step of applying the process includes a step of removing material from the rear face of the annular flange to form the sealing profile.

C7.1. The method of paragraph C7, wherein the step of removing material includes a step of moving a milling cutter bit along an annular path.

C7.2. The method of paragraph C7 or of paragraph C7.1, wherein the step of removing material includes a step of rotating a milling cutter about its axis of rotation.

C8. The method of any one of paragraphs from C000 to C7.2, comprising a step of emitting ultrasounds which cause the at least one tool to vibrate.

C8.1. The method of paragraph C8, wherein the step of emitting ultrasounds follows the step of applying the process.

C8.2. The method of paragraph C8, wherein the step of emitting ultrasounds precedes, or is simultaneous with, the step of applying the process.

C9. The method of any one of paragraphs from C000 to C8.2, comprising a step of emitting laser rays by means of a plurality of laser emitters associated with the at least one tool.

C9.1. The method of paragraph C9, wherein the step of emitting laser rays precedes the step of applying the process.

C9.2. The method of paragraph C9, wherein the step of emitting laser rays is included in the step of applying the process.

C9.3. The method of any one of paragraphs from C9 to C9.2, comprising a step of setting a sealing profile selected by the user, wherein the step of emitting laser rays comprises switching on a part of the plurality of emitters as a function of the user-set sealing profile.

C10. The method of any one of paragraphs from C000 to C9.3, comprising a step of directing pressurized liquid at the annular flange in order to create the sealing profile.

C11. The method of any one of paragraphs from C000 to C10, wherein the step of applying the process comprises activating one or more parts of a plurality of parts making up the at least one tool (that is, moving them towards and into abutment with the flange).

C11.1. The method of paragraph C11, wherein the step of applying the process comprises activating a first part of the at least one tool and then activating a second part of the at least one tool.

C12. The method of any one of paragraphs from C to C10, wherein the step of applying the process is carried out after a step of forming the cup, inside a mould of a forming machine, configured to form the cups from respective measured quantities of material or preforms.

C12.1. The method of paragraph C12, comprising a step of telescopically extracting the at least one tool from the mould.

C13. The method of any one of paragraphs from C000 to C12.1, comprising a step of centring the cup inside the pocket, including a step of activating a centring tool.

C13.1. The method of paragraph C13, wherein the step of centring precedes the step of applying the process.

C13.2. The method of any one of paragraphs from C000 to C13.1, comprising a step of welding a lid to the front face of the cup by means of a welder, wherein the step of applying the process is simultaneous with the step of welding.

C13.2.1. The method of paragraph C13.2, wherein the welder also acts as an abutment for the at least one tool.

C14. The method of any one of paragraphs from C000 to C13.1.1, comprising a step of rotating the pockets of the plurality of pockets (or the at least one pocket) on a rotary carousel.

C14.1. The method of paragraph C14, wherein the step of applying the process is carried out in each pocket (or in the at least one pocket) by means of a respective tool which rotates as one with the carousel.

C15. The method of any one of paragraphs from C000 to C13.1.1, wherein the step of applying the process comprises a step of simultaneously processing a plurality of cups received (or housed) in respective pockets of a plurality of pockets.

C15.1. The method of paragraph C15, comprising a step of placing the cups in the pockets of the plurality of pockets before the step of applying the process and a step of extracting the cups from the pockets of the plurality of pockets after the step of applying the process.

C16. The method of any one of paragraphs from C000 to C13.1.1, comprising a step of moving the pockets of the plurality of pockets (or the at least one pocket) on a conveyor belt.

C16.1. The method of paragraph C16, wherein the step of applying the process comprises a step of processing one flange (of one cup) at a time when the respective pocket is in a processing zone of the conveyor belt.

C17. The method of any one of paragraphs from C000 to C16.1, wherein the step of applying the process comprises a step of processing the front face of the annular flange of the cup to form a knurled zone suitable for welding the lid.

C18. The method of any one of paragraphs from C000 to C17, wherein the product may, depending on the application, be coffee or other infusion product, or other solid, liquid or creamy food product, or other type of product (for example a drug).

The invention claimed is:

1. A line for making capsules intended to contain a product, comprising:
 a forming machine configured to form plastic cups, wherein each cup includes
  a containment body, which extends between a bottom wall and an upper edge,
  an annular flange connected to the upper edge and having a rear face, directed towards the containment body, and a front face, opposite to the rear face and adapted to receive a lid to form the capsule; and
 an apparatus for processing the cups, the apparatus comprising:
  at least one pocket, configured to house a corresponding cup;
  at least one tool configured to apply a process to at least the rear face or the front face of the annular flange of the cup inside the at least one pocket, so as to form a sealing profile;
 a filling machine configured to fill the cups with coffee or other solid or liquid products; and
 an applicator machine, configured to apply a lid to the front face of each cup to form a respective capsule.

2. The line according to claim 1, wherein the apparatus comprises:
 a plurality of pockets configured to house a corresponding plurality of cups;
 an infeed station configured to receive the cups and placing them in respective pockets of the plurality of pockets; and
 an outfeed station configured to release the cups, with the sealing profile formed on them, to an outlet of the apparatus,
 wherein the at least one tool is configured to apply the process to the rear face of the annular flange of a cup inside a respective pocket of the plurality of pockets to form a sealing profile.

3. The line according to claim 2, wherein the apparatus comprises a rotary carousel, wherein the pockets of the plurality of pockets are angularly spaced on the carousel.

4. The line according to claim 3, wherein the apparatus includes, for each pocket of the plurality of pockets, a respective rotary tool which rotates as one with the carousel and which is configured to apply a process to the rear face of the annular flange of the cup inside the pocket.

5. The line according to claim 1, wherein the at least one tool is configured to apply a mechanical force on the rear face of the annular flange of the cup.

6. The line according to claim 1, wherein the apparatus comprises a corresponding abutment element associated with the at least one tool,
 wherein the at least one tool includes a main body and one or more protrusions projecting from the main body, and
 wherein the at least one tool and the corresponding abutment element are movable between an open configuration, in which they are spaced apart, and a closed configuration, in which they are close together and the abutment element is in contact with the front face of the annular flange and the one or more protrusions of the at least one tool penetrate the annular flange, impressing the sealing profile therein.

7. The line according to claim 6, wherein the abutment element is radially symmetric about its axis of symmetry and includes
 a contact surface, configured to come into abutment against the front face of the annular flange, and
 a centring body which projects from the contact surface and which, in the closed configuration, at least partly enters the containment body of the cup to provide a centring effect on the cup in the respective pocket.

8. The line according to claim 1, wherein the at least one tool includes a respective heating element configured to heat the at least one tool.

9. The line according to claim 1, wherein the apparatus comprises at least one heater configured to heat the annular flange of the cup inside the at least one pocket.

10. The line according to claim 1, wherein the apparatus comprises a control unit which is specific to the apparatus and configured to control the at least one tool.

11. The line according to claim 1, wherein the at least one tool includes a milling cutter configured to remove material from the rear face of the annular flange, to form the sealing profile.

12. The line according to claim 1, wherein the at least one tool includes a plurality of processing elements and wherein the apparatus comprises a control unit programmed to selectively switch on a part of the plurality of processing elements as a function of the selected type of sealing profile.

13. The line according to claim 12, wherein the processing elements include laser emitters distributed on a surface to form an array of laser emitters.

14. The line according to claim 1, wherein the apparatus comprises:
 a plurality of pockets, each pocket configured to house a corresponding cup in a respective cavity;
 a rotary carousel, wherein the pockets of the plurality of pockets are angularly spaced on the carousel;
 for each pocket of the rotary carousel, a respective centring device, the centring device including a first part and a second part, movable towards and away from each other, wherein each of the first part and a second part of the centring device delimits a portion of the cavity.

15. The line according to claim 1, wherein the forming machine is configured to form the cups by compression moulding.

16. The line according to claim 1, wherein the line is configured to transfer the cups, with the sealing profile formed on them and released by the outfeed station of the apparatus for processing the cups, to an infeed station of the filling machine.

17. A method for making capsules intended to contain a product, comprising the following steps:
- forming plastic cups, wherein each cup includes
  - a containment body, which extends between a bottom wall and an upper edge,
  - an annular flange connected to the upper edge and having a rear face, directed towards the containment body, and a front face, opposite to the rear face; and
- processing the plastic cups adapted to be filled with coffee or other products, whether solid or liquid, and to be closed with respective lids to form corresponding capsules,
- filing the cups with coffee or other solid or liquid products;
- applying a lid to the front face of each cup to form a respective capsule,
- wherein the processing step comprises the following steps:
- receiving the cups and placing each cup in a pocket of the apparatus;
- applying a process to at least the rear face or the front face of the annular flange of the cup inside the pocket, so as to form a sealing profile by means of at least one tool of the apparatus; and
- releasing the cups with the sealing profile formed on them.

18. The method according to claim 17, wherein the step of applying the process comprises a step of processing the front face of the annular flange of the cup to form a knurled zone suitable for welding the lid.

19. An apparatus for processing cups, wherein each cup includes
- a containment body, which extends between a bottom wall and an upper edge,
- an annular flange connected to the upper edge and having a rear face, directed towards the containment body, and a front face, adapted to receive a lid to form a capsule;

the apparatus comprising:
- at least one pocket, configured to house a corresponding cup; and
- at least one tool configured to apply a process to at least the rear face or the front face of the annular flange of the cup inside the at least one pocket, so as to form a sealing profile;
- wherein the at least one tool includes a plurality of processing elements;
- wherein the apparatus comprises a control unit programmed to selectively switch on a part of the plurality of processing elements as a function of the selected type of sealing profile; and
- wherein the processing elements include laser emitters distributed on a surface to form an array of laser emitters.

* * * * *